US 11,752,646 B2

(12) United States Patent
Hu et al.

(10) Patent No.: US 11,752,646 B2
(45) Date of Patent: Sep. 12, 2023

(54) PORTABLE AND EASY-TO-USE ALTERNATE FISH CUTTER

(71) Applicant: Weihai Yuanji Outdoor Products Co., Ltd., Shandong (CN)

(72) Inventors: Dewei Hu, Shandong (CN); Zuoqiang Dou, Shandong (CN); Yanping Jiang, Shandong (CN)

(73) Assignee: Weihai Yuanji Outdoor Products Co., Ltd., Weihai (CN)

( * ) Notice: Subject to any disclaimer, the term of this patent is extended or adjusted under 35 U.S.C. 154(b) by 0 days.

(21) Appl. No.: 17/726,530

(22) Filed: Apr. 22, 2022

(65) Prior Publication Data

US 2023/0211514 A1 Jul. 6, 2023

(30) Foreign Application Priority Data

Dec. 30, 2021 (CN) .......................... 202111680797.0

(51) Int. Cl.
*B26B 7/00* (2006.01)
*A22C 25/18* (2006.01)

(52) U.S. Cl.
CPC ............ *B26B 7/005* (2013.01); *A22C 25/185* (2013.01)

(58) Field of Classification Search
CPC ....... B26B 7/005; A22C 25/185; A22C 25/18; A22C 25/17
USPC ........................................................... 30/47
See application file for complete search history.

(56) References Cited

U.S. PATENT DOCUMENTS

| | | | | |
|---|---|---|---|---|
| 3,417,469 A | * | 12/1968 | Cousins | B26B 7/005 30/277.4 |
| 3,604,114 A | * | 9/1971 | Swanke | A47J 43/087 30/277.4 |
| 3,679,958 A | * | 7/1972 | Chambers | B26B 7/005 310/50 |
| 4,631,827 A | * | 12/1986 | Moores | B26B 7/005 74/56 |
| 7,757,405 B2 | * | 7/2010 | Peterson | A01G 3/053 30/220 |
| 8,028,423 B2 | * | 10/2011 | Matsuo | A01G 3/053 30/220 |
| 10,136,584 B1 | * | 11/2018 | Cours | F16H 1/30 |
| 2002/0178589 A1 | * | 12/2002 | Wong | B26B 7/005 30/277.4 |
| 2003/0192191 A1 | * | 10/2003 | Wong | A22C 17/0013 30/277.4 |

(Continued)

FOREIGN PATENT DOCUMENTS

CN 209788335 U 12/2019

*Primary Examiner* — Omar Flores Sanchez

(57) ABSTRACT

A portable and easy-to-use alternate fish cutter is provided. It includes a housing constituting a handle, a cutting knife, a driving mechanism, a switch button, and a power supply module. The cutting knife includes a pair of left and right knives arranged side by side. It also includes left and right knife arms. It also includes a worm wheel arranged behind the left knife arm and the right knife arm. It also includes a left connecting rod and a right connecting rod. It also includes a worm and a motor for driving the worm wheel to rotate. Surfaces of the worm wheel and the worm are both provided with mutually meshing helical teeth. The structure of the invention is small and portable, fits the shape of traditional knives, can improve the efficiency and experience of slaughtering.

4 Claims, 15 Drawing Sheets

(56) References Cited

U.S. PATENT DOCUMENTS

2005/0198836 A1\* 9/2005 Thiele .................... B26B 7/005
                                                          30/277.4
2012/0167394 A1\* 7/2012 Lugert ................... A01G 3/053
                                                          30/223

\* cited by examiner

PORTABLE AND EASY-TO-USE ALTERNATE FISH CUTTER

CROSS REFERENCE TO RELATED APPLICATIONS

The present application claims the benefit of Chinese Patent Application No. 202111680797.0 filed on Dec. 30, 2021, the contents of which are incorporated herein by reference in their entirety.

FIELD OF THE INVENTION

The invention belongs to the field of a special cutter for cutting fish meat, in particular, relates to a portable and easy-to-use alternate fish cutter, and specially, to a small and portable fish cutting knife with a traditional cutter shape to facilitate light work outdoors.

BACKGROUND OF THE INVENTION

For the catch of fishing (generally referring to aquatic products such as fish and shrimp, especially fish), in a traditional slaughtering method, traditional cutters are used to chop and cut, which often requires auxiliary tools such as chopping boards. In the kitchens of ordinary households or small and medium-sized restaurants, there is basically an objective demand for slaughtering fish, and almost all of them are handled with traditional knives. With the large-scale development of the fishery industry, the catches from large-scale fishing or large-scale farms usually need to be initially slaughtered, then enter the cold fresh transportation channel, and then transported to the market for sale, which creates the need for intensive slaughter of plenty of catches. At this time, the automated slaughtering equipment for the catch came into being. This equipment is often relatively large and is often used in the fixed slaughtering site. But neither traditional knives nor large-scale slaughtering equipment are suitable for small-scale operations in the field.

A small quantity of catches from wild fishing, such as those caught by fishing enthusiasts, are usually carried and stored in small containers such as buckets. The catches are brought home in bulky storage containers, where they are slaughtered. In order to keep it fresh, the storage container also usually contains a sufficient amount of water, but this further adds to the weight of the transport, making the transport process laborious, which is a very unpleasant experience. Later, some small refrigeration equipment, such as car refrigerators, can no longer be carried by human power because of the refrigeration equipment involved, and need to rely on transportation vehicles. Small refrigeration equipment can keep fish cold and fresh without the need to use running water to keep fish and shrimp fresh. On the one hand, the weight and volume of transport can be greatly reduced, and the way of chilling is easier. On the other hand, it can greatly prolong the fresh-keeping time, even for a few days or months, which can prolong the hunting time in the wild. For example, it is convenient for fishing enthusiasts to enjoy fishing for a longer time. In addition, the sea fishing activities that have emerged in recent years have attracted many fishing enthusiasts. Because the sea fishing takes a long time, even it may take many days to go out to sea, the refrigeration equipment is almost necessary on board. However, the limited cold fresh space is often unable to meet the harvest of many days, especially many marine fishes are relatively large, and it is easy to crowd the cold fresh space. At this time, if the catch can be slaughtered on-site, only the necessary parts are kept, and the unnecessary parts such as internal organs, heads, bones, shells, etc. can be discarded, which can greatly improve the utilization rate of the cold fresh space. But unfortunately, in this wild environment, the slaughtering with traditional tools will have many inconveniences, and it may even be impossible to slaughter under limited conditions due to the hardness of some catches.

The prior art such as Chinese patent CN201821621876.8 discloses a fish cutter, which has a compact and portable structure and is suitable for small-scale slaughtering in the wild. However, the design direction of its structure is to increase the function of the knife, that is, it is provided with a foldable fish hook on the handle of the fish cutting knife, which is convenient for grasping and slaughtering with the aid of the fish hook, which enriches the fish cutting knife function. However, this does not really effectively improve the slaughtering efficiency and experience of the fish cutting knife, and there are still major deficiencies.

SUMMARY OF THE INVENTION

Aiming at the deficiencies in the prior art, the purpose of the present invention is to design a portable and easy-to-use alternate fish cutter. On the one hand, its structure is small and portable, which fits the shape of traditional knives and is easy to use and operate. On the other hand, it can improve the efficiency and experience of slaughtering, and is especially suitable for fishing enthusiasts to use in the wild.

For realizing the above-mentioned technical purpose, the concrete scheme that the present invention adopts is:

a portable and easy-to-use alternate fish cutter, includes a housing constituting a handle, a cutting knife extending from an inside of the handle to an outside of a front end of the handle, a driving mechanism for the cutting knife provided in the handle, a switch button for the driving mechanism located on the housing, and a power supply module located at a rear end of the handle; wherein the cutting knife includes a pair of left and right knives arranged side by side, the left and right knives both include a blade portion located at a front end thereof and a handle portion located at a rear end thereof, and the handle portion is inserted into the handle from the front end of the handle;

the driving mechanism for the cutting knife includes a pair of left and right knife arms arranged in the handle, a handle portion of the left knife is detachably fixed on the left knife arm from front to back, and a handle portion of the right knife is detachably fixed on the right knife arm from front to back, the handle is also provided with a guide rail or a guide channel for guiding the left knife arm and the right knife arm to reciprocate only along a front and rear direction;

the driving mechanism for the cutting knife also includes a worm wheel arranged behind the left knife arm and the right knife arm, and a rotating shaft of the worm wheel is arranged along a left and right direction and is perpendicular to moving directions of the left knife arm and the right knife arm, both sides of the worm wheel are respectively provided with a left eccentric wheel and a right eccentric wheel, and the rotating shaft of the worm wheel passes through the left eccentric wheel and the right eccentric wheel, a center of the left eccentric wheel and a center of the right eccentric wheel are located on the both sides of the rotating shaft of the worm wheel, when the worm wheel rotates, the motion trajectories of the left eccentric wheel and the right eccentric wheel projected in a front and rear direction alternate;

it further comprises a left connecting rod and a right connecting rod connecting the worm wheel and the two knife arms, a front end of the left connecting rod is drivingly connected with a rear end of the left knife arm, and a rear end of the left connecting rod is rotatably connected with the left eccentric wheel of the worm wheel, a front end of the right connecting rod is drivingly connected with a rear end of the right knife arm, and a rear end of the right connecting rod is rotatably connected with the right eccentric wheel of the worm wheel, the left eccentric wheel drives the left knife arm through the left connecting rod, and the right eccentric wheel drives the right knife arm through the right connecting rod;

the driving mechanism for the cutting knife also includes a worm and a motor for driving the worm wheel to rotate, and surfaces of the worm wheel and the worm are both provided with mutually meshing helical teeth, the worm is set on an output shaft of the motor, and the worm is driven by the motor to rotate, and the worm drives the worm wheel to rotate, in the handle, the motor, the worm, the worm wheel, the connecting rods and the knife arms of the driving mechanism are arranged in sequence from the back to front; and the power supply module is connected to the motor and supplies power to it, the switch button is connected to a power supply circuit, and the operation of the motor is controlled by the switch button.

This invention provides a core drive solution with a design in which a fish cutting mechanism with its own cutting power is used to save manpower and improve slaughter experience and efficiency. Moreover, it has compact and small structure, and the overall shape and size are close to that of a traditional cutter which is convenient to carry and operate. The specific working principle is as follows: the motor runs under the power supply of the power supply module; first, the worm is driven to rotate, the worm drives the worm wheel to rotate, the worm wheel drives the two eccentric wheels, and the eccentric wheels drive the connecting rods to swing, the connecting rods output the reciprocating motion in the front-rear direction to the knife arms, the knife arms only reciprocate in the front-rear direction under the restriction of the guide rail or the guide channel and the driving of the connecting rods, and the knives fixed on the knife arms then realize the alternate cutting motion back and forth. When in use, the blades of the knives are pressed against the position to be cut of the fish, and the partial cutting can be automatically completed. The switch button can freely control the start or stop of the cutting motion.

Preferably, the left knife arm and the right knife arm are both provided with an installation channel arranged from front to back, for inserting handle portions of the knives; a handle portion of the left knife located in its installation channel is provided with a left notch, and a handle portion of the right knife located in its installation channel is provided with a right notch;

a position of the installation channel of the knife arm of the left knife corresponding to the notch of the left knife is provided with a left knife clip, a position of the installation channel of the knife arm of the right knife corresponding to the notch of the right knife is provided with a right knife clip, each of the left and right knife clip includes a knife clamping latch at an upper end and protruding upward, a knife clamping bolt at a lower end and extending laterally, and a spring clamping tongue protruding from a side, the structure of the left and right knife clips is the same or symmetrical;

it further includes a spring or elastic piece connected to the spring clamping tongue at one end, and continuously exerts an upward elastic force on the spring clamping tongue through the spring or elastic piece, so that the corresponding knife clip maintains an upward movement trend, when the handle portion of the corresponding knife is inserted into the corresponding installation channel, the corresponding knife clamping bolt is snapped upward into the notch to lock the knife; at this time, the knife clamping latch extends upward and protrudes above the knife arm.

Preferably, it further includes a knife changing button, including a button cap and elastic wings arranged on a peripheral side of the button cap, the knife changing button is installed in the housing through the elastic wings, and the elastic wings make a top of the button cap exposed out of the housing upwards, a bottom end of the button cap is located above the knife clamping latch, by pressing the button cap, the bottom end of the button cap presses the knife clamping latch, so that the knife clip moves downwards, the knife clamping bolt is withdrawn from the notch downward to release the locking of the cutting knife; and when the pressing is released, the button cap returns to its original position under the elastic force of the elastic wings.

The fish cutter of the present invention is designed with a structure that is convenient to replace the knife, and needs to take into account the compactness and firmness in a narrow structure.

Preferably, a bending portion is provided between the blade portion and the handle portion of the left knife and/or the right knife, and the bending portion makes the distance between the blade portion of the left knife and the blade portion of the right knife smaller than the distance between the handle portion of the left knife and the handle portion of the right knife. Further narrowing the blade spacing of the two knives can improve the cutting accuracy and sharpness.

Preferably, each outer side of the left knife and the right knife is provided with a balance block, including a left balance block and a right balance block; the left balance block is arranged between the blade portion and the handle portion of the left knife; right balance block is arranged between the blade portion and the handle portion of the right knife;

the left balance block and the right balance block respectively extend from an outer side of the corresponding knives to between the left and right knives inwardly, thereby forming a pair of anti-pressure portions, that is, a left anti-pressure portion on the left balance block and a right anti-pressure portion on the right balance block, the two anti-pressure portions are arranged opposite to each other without contact.

The design of the balance block is more important and has multiple uses. First, it can weaken or eliminate the vibration or jitter, or even resonance that may occur in the high-speed reciprocating motion of the strip cutting knives. Secondly, the balance blocks are fixed between the two blade portions and the knife handle portions, which can prevent the knives from being damaged due to sudden or unexpected changes in resistance, such as the knives being stuck by too hard fish meat or fish bones, at this time, the driving mechanism is still running, which may cause a blade body to be easily broken, especially at the position of the bending portion, the design of the bending portion causes the blade body to be bent, and it is more likely to occur in this position if it breaks, and fixing the balance block on the bending portion is beneficial to prevent accidental breakage. Again, it can balance the frictional resistance of movement between the two knives, the distance between the two blade portions is very small at rest or there is direct light contact between the two, during the reciprocating motion, there will be inevitable slight vibration or jitter, which may cause variable friction between the two blade portions, the friction force varies with the magnitude of the squeezing force between the two blade portions, in addition, during the cutting operation, the two blades will be directly squeezed by the fish meat or bone to generate a greater squeezing force, resulting in greater frictional force, the disadvantage caused by the increase of frictional force is obvious, at this time, the anti-pressure portion of the cutting knife plays a protective role, when the two cutting knives are deformed by being squeezed inward, the pair of anti-pressure portions abut against each other to prevent excessive deformation of the knives, and to a certain extent, it can prevent the mutual squeezing force between the knives from being too large, resulting in excessive frictional force. Finally, the balance block can also protect the hand to prevent the fingers from accidentally touching the blade forward, to avoid accidental injury.

Preferably, the blade portion of the left knife or the right knife is provided with a strip hole penetrating a left and right sides, and the strip hole is arranged along a front and rear direction; a mushroom-shaped convex cap is provided on the blade portion of the other knife opposite to the position of the strip hole; the convex cap includes a rod portion and a cap portion located at an end of the rod portion, the rod portion passes through the strip hole, and the cap portion is located outside the strip hole; the cap portion and the blade portion of the knife corresponding to the convex cap sandwiches the blade portion of the knife corresponding to the strip hole; and the diameter of the cap portion in an up-down direction is larger than the width of the strip hole in the up-down direction. It is used to limit the degree of separation of the two knives to prevent the left or right knife from being seriously deviated to the sides or up and down due to accidents during the cutting process, and to further protect personal safety.

Preferably, the blades of the blade portions of the knives are smooth linear blades, or serrated blades.

Preferably, the guide rail is specifically a sliding rail, a sliding groove or a guide rod arranged along a front and rear direction, and the left knife arm and the right knife arm are arranged on the guide rail.

Preferably, the guide channel is formed as a plurality of positioning rings arranged in a front and rear direction, and the left knife arm and the right knife arm are arranged side by side in the middle of the plurality of positioning rings; or the guide channel is a conduit arranged in a front and rear direction, the left knife arm and the right knife arm are arranged side by side in the conduit, and the inside of the conduit has a channel matching the shapes of the left knife arm and the right knife arm.

Whether it is the sliding rail, the sliding groove, the guide rod or the guide conduit, it is a relatively common structure, which can be used to restrict the movement of the knife arm in a limited direction in this scheme. The use of two or more positioning rings is a good choice in terms of cost, structural complexity and limitation.

Preferably, the left knife arm and the right knife arm are arranged side by side and abut with each other, and a number of smooth protrusions are arranged on opposite abutting sides; and when the left and right knife arms move alternately, the smooth protrusions are used to reduce the friction force between the left and right knife arms. In order to design a compact structure, the two knife arms are placed together, resulting in direct contact, which will generate a lot of friction.

Preferably, the switch button includes an elastically resettable pressure case, and a pressing switch element located on an inner side of the pressure case, the switch element is connected into a power supply circuit of the motor and the power supply, and the pressure case presses the switch element to control the working state of the motor by pressing the pressure case;

the pressure case is provided with a safety bolt, the safety bolt includes a pushing block that can be toggled left and right, the pushing block is arranged on a surface of the pressure case; the safety bolt also includes a safety pin arranged in the pressure case and penetrating both sides of the pressure case along a left-right direction, the pushing block is connected inward to the safety bolt, and the left and right movement of the safety pin is controlled by toggling the pushing block, such that a left end of the safety pin protrudes out of the pressure case to the left or a right end of the safety pin protrudes out of the pressure case to the right;

the height between the left end of the safety pin and the housing is different from the height between the right end of the safety pin and the housing, when one end of the safety pin is toggled to protrude to a side with a smaller height, due to the blocking between one end of the safety pin and the housing on the side with a larger height, the pressure case is restricted and cannot be pressed further to trigger the switch element; when the other end of the safety pin is toggled to protrude to the side with the higher height, the restriction is cancelled and the pressure case can continue to be pressed to trigger the switch element until the other end of the safety pin is blocked by the housing on the higher side, over-pressing is prevented, thus protecting the switch element;

a spring is sleeved on the safety pin, and the spring continuously applies an elastic force to the safety pin toward the side of the housing with the smaller height.

Preferably, the power supply module is a battery or an external power supply terminal. In the field, there is no external power supply in many cases, so the battery will be most of the choice, which can be a replaceable battery or a rechargeable battery.

Preferably, the power supply module is provided with a battery compartment protruding toward a front end, the battery compartment is equipped with a battery, a front end of the battery compartment is provided with positive and negative electrodes, and the positive and negative electrodes are respectively connected to two poles of the battery; a rear end of the handle is provided with a groove for inserting the battery compartment, and the groove is provided with two power-taking contact pieces corresponding to the positive and negative electrodes, when the battery compartment is inserted into the groove, the two power-taking contact pieces are connected to the positive and negative electrodes respectively;

a rear end of the housing of the handle is provided with a power supply removal plug, the power supply removal plug includes a push plate exposed out of a surface of the housing, and the push plate can be pushed along a left and right direction; an inner side of the push plate is connected with a triangular bolt in the shape of a right-angled triangle, two right-angled sides face the front and lateral portions respectively, and its oblique side faces the lateral and rear portion; a side of the triangular bolt facing the lateral portion is provided with a guide post, and a compression spring is sleeved on the guide post to continuously exert a reverse elastic force on the triangular bolt;

a corresponding position on the power supply module is provided with a locking protrusion, during the process of inserting the battery compartment of the power supply module into the groove at the rear end of the handle, the locking protrusion first abuts against the oblique side of the triangular bolt, that is, an inclined surface of the triangular bolt, in a direction from the rear to the front, the pushing force of the locking protrusion imposed on the inclined surface of the triangular bolt is increased, so that the triangular bolt moves laterally against the elastic force of the compression spring until it moves to a side of an advancing direction of the locking protrusion for the locking protrusion to pass over the triangle bolt, at this time, the triangular bolt loses the pushing force of the locking protrusion and is reset under the action of the elastic force of the compression spring; and after reset, a front side of the triangular bolt facing the front abuts against a rear side of the locking protrusion, so that the locking protrusion cannot be moved back, so as to lock the power supply module.

When it is necessary to unlock, remove or replace the power supply module, push the push plate by hand, so that the push plate drives the triangular bolt to move toward the compression spring until the front side of the triangular bolt (i.e. locking surface) leaves the locking protrusion. At this time, the power supply module is slightly moved backward, and the locking protrusion retreats over the locking surface. At this time, the push plate is released, and the triangular bolt of the push plate is reset under the elastic force of the compression spring. During the reset process, the inclined surface of the triangular bolt continues to push the locking protrusion, so that the power supply module is released to a further extent, and the power supply module can be easily removed.

The core driving mechanism of the invention is compact and arranged longitudinally. A housing with a handle profile is provided so that the handle profile housing can be easily designed to wrap and fix the driving mechanism inside the housing. Here, obviously, the knife will extend out from the front end of the housing of the handle, so that the overall shape of the fish cutter is closer to the shape of a traditional cutter. In addition, the balance blocks also need to be arranged at the front end of the housing of the handle to prevent the hand from accidentally extending forward and touching the blade.

In the solution of the present invention, the motor drives the worm to rotate, the worm drives the worm wheel to rotate, and the worm wheel drives the eccentric wheel to rotate eccentrically. The left and right eccentric wheels are located on opposite sides of the rotating shaft, so the movement trajectories of the left and right eccentric wheels are relatively misaligned. The eccentric wheels in alternate motion sequentially drives the connecting rods, the knife arms and the left and right knives to perform alternate motion, so as to achieve the purpose of cutting fish. The fish cutter of this invention does not have high requirements on the cutting board, and the automatic cutting can be completed by pressing the blade against the fish meat, largely independent of the reverse pressure provided by the cutting board, and the fish cutter is portable and easy to use. When used (for example, for smaller fish), the fish can be fixed with one hand, and the fish cutter can be operated with one hand with the other hand, which is especially suitable for fishing enthusiasts to work in the field. In addition, this embodiment adopts the structure of linkage driving by connecting rods, which has more advantages: first of all, the design of the connecting rod drive has better wear resistance, and even a bearing can be added to the rotating connection end of the connecting rod to achieve higher wear resistance requirements; secondly, the two ends of the connecting rod are directly connected by rotation, the clearance of the motion fit is small, and the running noise is small, the experience is better when using grease; and thirdly, the driving operation of the connecting rod is smoother, which can reduce the energy loss of the front and rear movement, making the cutting faster and the use efficiency higher.

Figure 1:
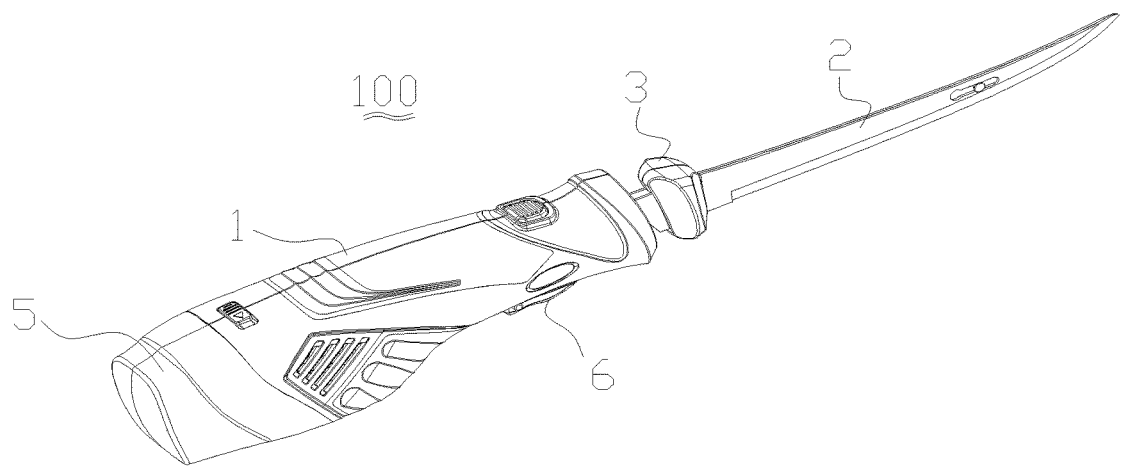
FIG. 1 is a three-dimensional structure schematic diagram of the fish cutter of the present invention.

EXPLANATION OF REFERENCE NUMERALS fish cutter 100, handle 1, cutting knife 2, balance block 3, motor 4, power supply module 5, switch button 6, power supply removal plug 7, knife changing button 8, and power-taking clip 9;

left half part 10b, right half part 10a; slot 11, socket 12, shaft column 13, first limiting portion 16, second limiting portion 17; groove 18;

left knife 21, right knife 22, left knife arm 23, right knife arm 24, left knife clip 25, right knife clip 26, first positioning ring 27, second positioning ring 28, elastic piece 29;

left blade portion 211, right blade portion 221, left blade tip 212, right blade tip 222, left bending portion 213, right bending portion 223, left cutting knife handle portion 214, right cutting knife handle portion 224, convex cap 217, rod portion 2172, cap portion 2171, strip hole 227, thin hole portion 2271, thick hole portion 2272, left balance guide hole 2131, left balance mounting hole 2132, right balance guide hole 2231, right balance mounting hole 2232, left notch 215, right notch 225, left tail hole 216, right tail hole 226;

clamping hole 231 of the left knife arm, clamping hole 241 of the right knife arm, pin hole 232 of the left knife arm, smooth protrusions 2331, 2332, 2333, and installation channel 234 of the left knife arm;

left knife clamping bolt 251, right knife clamping bolt 261, left spring clamping tongue 253, right spring clamping tongue 263, left knife clamping latch 252, right knife clamping latch 262;

left balance block 31, right balance block 32, left anti-pressure portion 311, right anti-pressure portion 321;

worm 41, worm wheel 42, worm wheel rotating shaft 43, shaft fixing seat 44, left connecting rod 45, right connecting rod 46, left pin rod 47, right pin rod 48; left eccentric wheel 422, right eccentric wheel 423, left connecting rod pin hole 452, right connecting rod pin hole 462, left connecting rod bearing hole 451, right connecting rod bearing hole 461;

battery compartment 51, locking protrusion 57, first electrode 58, second electrode 59;

pressure case 60, elastic leg 61, elastic hole 612, elastic tongue 613, safety bolt 62, pushing block 621, clamping fingers 622, safety pin 63, spring 632, bolt groove 64, bolt hole 641, engaging block 66, pressing portion 68, pressing switch element 69, pressing contact 691, wiring pins 692;

push plate 71, clamping plate 72, clamping groove 74, triangular bolt 73, locking surface 731, inclined surface 732, guide post 75, compression spring 76;

button cap 81, bottom end 82 of the button cap, elastic wings 83, 84; and first power-taking contact piece 98, second power-taking contact piece 99, and power transmission wiring pins 91 and 92.

DETAILED DESCRIPTION OF THE INVENTION

The technical solutions in the embodiments of the present invention will be described clearly and in detail below with reference to the accompanying drawings in the embodiments of the present invention. In the description of the present invention, it should be understood that the orientation or positional relationship expressed by the terms "length", "width", "thickness", "upper", "lower", "front", "rear", "left", "right", "vertical", "horizontal", etc. is based on the orientation or positional relationship shown in the accompanying drawings, and is only for the convenience of description and understanding, and does not refer to a specific device or element that must have a specific orientation or a specific orientation or is limited thereby. For example, in this solution, the direction of the blade tip is the front, the direction of the handle is the rear, the downward direction of the blade is down, the reverse direction is up, and the two sides of the blade are left and right. This indication is only for the convenience of description and understanding, and does not constitute a special means or limits.

As shown in FIGS. 1 to 29, a portable and easy-to-use alternate fish cutter according to a specific embodiment of the present invention has a compact and portable structure, fits the shape of a traditional knife, can improve the efficiency and experience of slaughtering, and is especially suitable for fishing enthusiasts to use in the wild.

The fish cutter 100 has a handle 1 that is composed of a housing including a left half part 10b and a right half part 10a. The left and right half parts cover and fix a driving mechanism inside the housing from the left and right sides. A cutting knife 2 extends out of the handle 1 along a front end of the handle. The driving mechanism is compact and arranged longitudinally. The housing with a handle profile is provided so that the handle profile housing can be easily designed to wrap and fix the driving mechanism inside the housing. Here, obviously, the cutting knife 2 will extend out from the front end of the housing of the handle 1, so that the overall shape of the fish cutter 100 is closer to the shape of the traditional knife.

Figure 18:
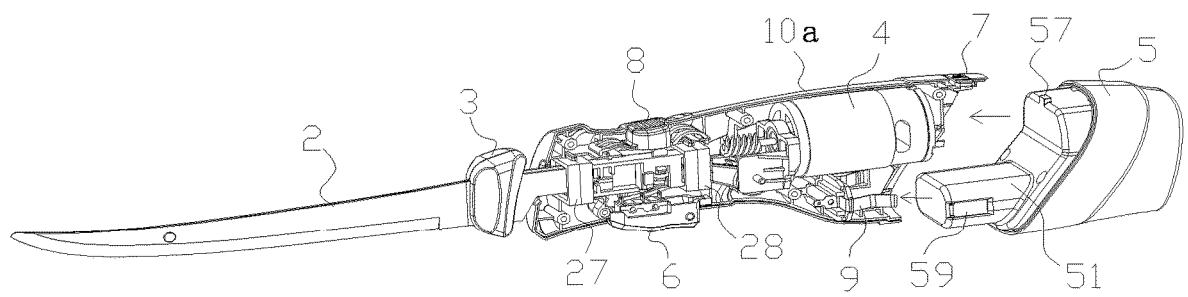
FIG. 18 is a schematic diagram of the internal structure of the fish cutter of the present invention.

It can be seen from FIG. 1 and FIG. 18 that a switch button 6 is arranged on the housing of the handle 1 and is designed on the lower side of the front end of the handle 1. This position is exactly the position corresponding to the finger when the handle is held by hand. When in use, the user only needs to hold the handle in a normal posture, the fingers can press on the switch button 6, and the switch can be pressed with a little force. The switch button 6, a power supply module 5, and a motor 4 are connected by wires to form a control loop. When the switch button is turned on, the motor works; otherwise, it stops working. The power supply module 5 is arranged at the rear end of the handle, and the power supply module 5 is locked and removed by a power supply removal plug 7. The power supply module 5 preferably uses a battery. In the field, there is no external power supply in many cases, so the battery will be most of the choices, which can be a replaceable battery or a rechargeable battery. A knife changing button 8 is arranged on the upper side of the front end of the handle, and it is not easy to touch this position when holding the knife handle normally, so it can be avoided as much as possible to touch this position by mistake.

Figure 2:
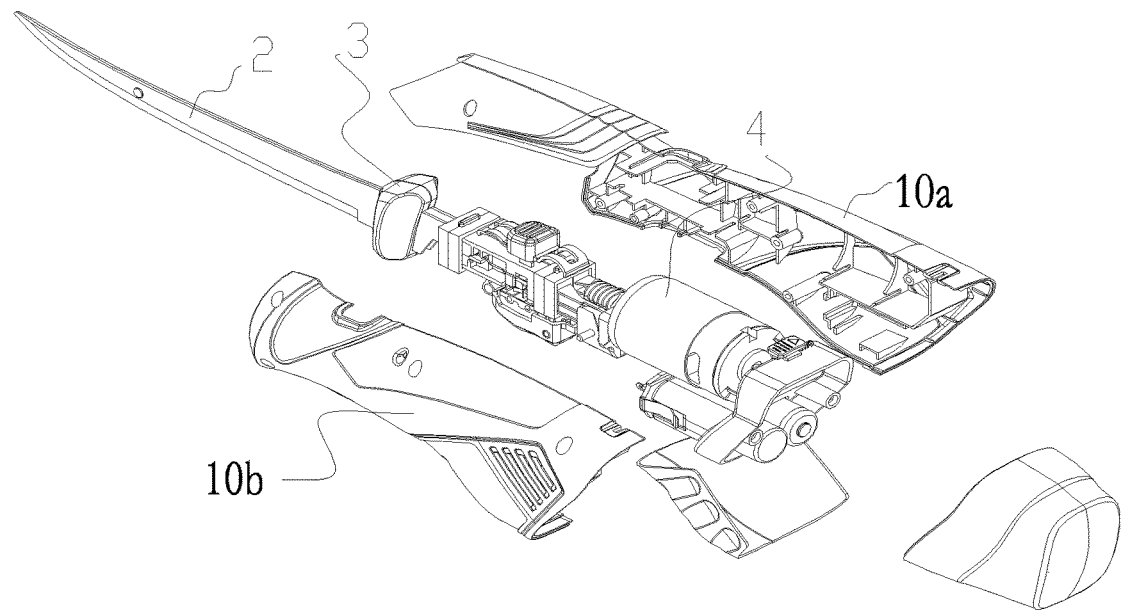
FIG. 2 is an exploded view of the structure of the fish cutter of the present invention.
Figure 3:
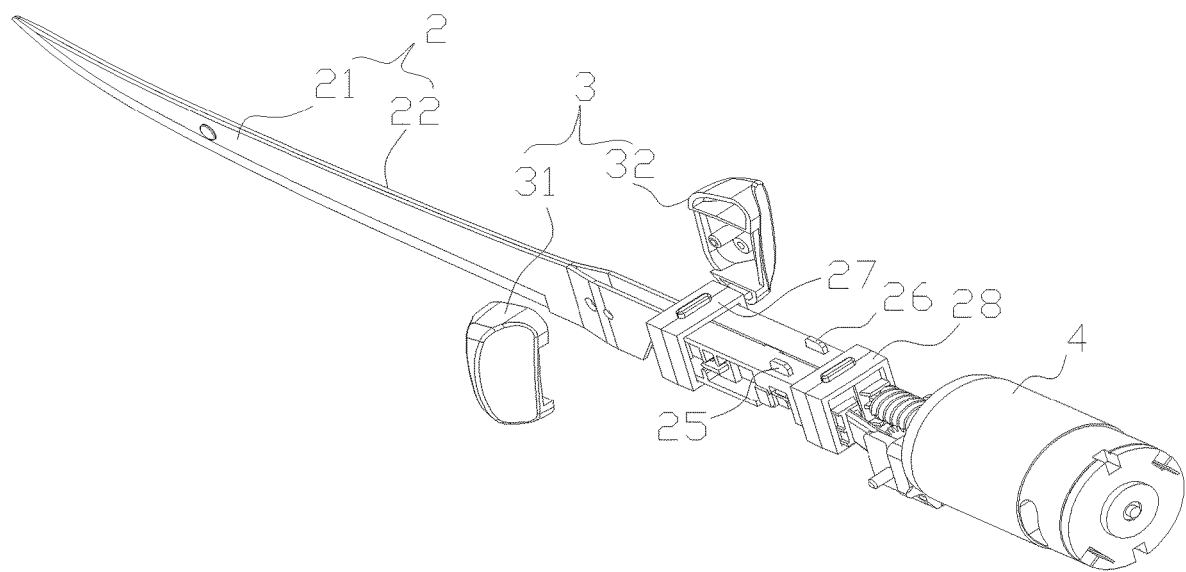
FIG. 3 is a schematic diagram of a driving mechanism of the fish cutter of the present invention.
Figure 4:
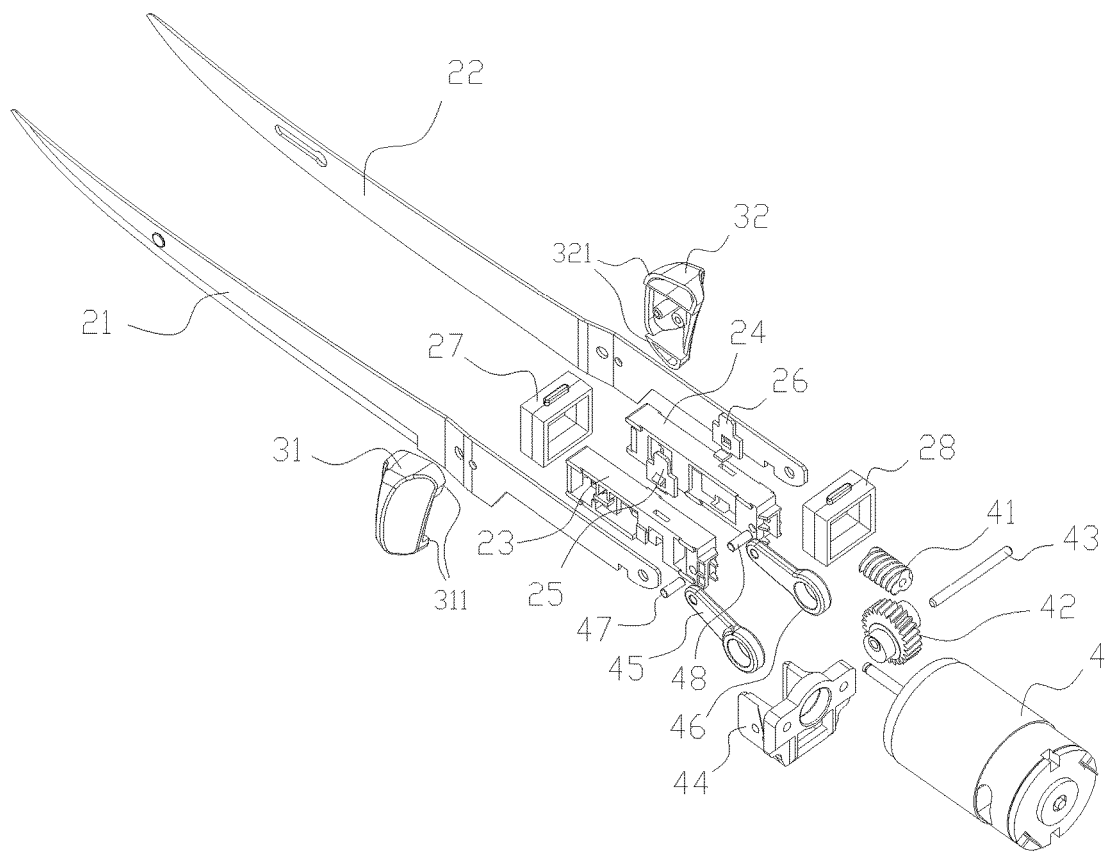
FIG. 4 is an exploded view of the driving mechanism of the fish cutter of the present invention.

The specific structure of the driving mechanism inside the handle 1 can be seen from FIGS. 2 to 4. The motor 4 is adjacent to the battery and is located at the front end of the battery. In the forward direction, it also includes a worm 41, a worm wheel 42, a left connecting rod 45, a right connecting rod 46, a left knife arm 23, a right knife arm 24 and the cutting knife 2, and they are installed in sequence from the back to the front according to the linkage relationship.

It can be seen from FIG. 4, and FIG. 15-FIG. 17 that the surface of the worm wheel 42 and the surface of the worm 41 are provided with mutually meshing helical teeth, and the worm 41 is directly arranged on the shaft of the motor 4 along the front-rear direction. The worm wheel 42 is arranged on the lower side of the worm 41, and the surfaces of the two are meshed with each other through matching teeth. A worm wheel rotating shaft 43 is arranged along the center of the worm wheel 42. The worm wheel rotating shaft 43 is disposed in the left-right direction and is perpendicular to the rotation direction of the worm 41. Both ends of the worm wheel rotating shaft 43 are installed and fixed by a shaft fixing seat 44.

Both sides of the worm wheel 42 are respectively provided with a left eccentric wheel 422 and a right eccentric wheel 423. The worm wheel rotating shaft 43 passes through the left eccentric wheel 422 and the right eccentric wheel 423, so that the outer circumferential surfaces of the two eccentric wheels wrap the passing point of the worm wheel rotating shaft 43 therein. But at the same time, a center of the left eccentric wheel 422 and a center of the right eccentric wheel 423 are located on both sides of the worm wheel rotating shaft 43, respectively, so that when the worm wheel 42 rotates, the motion trajectories of the left eccentric wheel 422 and the right eccentric wheel 423 projected in the front-rear direction alternate.

It also includes a left connecting rod 45 and a right connecting rod 46. The rear end of the left connecting rod 45 is provided with a left connecting rod bearing hole 451, and the front end thereof is provided with a left connecting rod pin hole 452. The rear end of the right connecting rod 46 is provided with a right connecting rod bearing hole 461, and the front end thereof is provided with a right connecting rod pin hole 462. The structures of the left connecting rod 45 and the right connecting rod 46 are the same. When installing, install the left connecting rod 45 and the right connecting rod 46 from both sides of the left eccentric wheel 422 and the right eccentric wheel 423 inwardly, so that the worm wheel rotating shaft 43 passes through the bearing holes of the two connecting rods. The two bearing holes are respectively sleeved on the outer circumferences of the two eccentric wheels, and the inner sides of the bearing holes and the outer circumferences of the eccentric wheels are connected in relative rotation, which can be connected by bearings; it can also be connected by direct sliding contact, so that the two can produce relative sliding friction, at this time, some known wear-resistant materials can be used as the friction surface. A smooth wear washer or lubricant can also be placed between the two to reduce frictional resistance during rotation.

In addition, since the worm wheel rotating shaft 43 is located in the bearing holes, it is convenient for the worm wheel 42 to continue to rotate rapidly in a same direction without worrying about the movement conflict between the connecting rods and the worm wheel shaft. Since the centers of the two eccentric wheels are located on two sides of the bearing shaft 43 respectively, when the worm wheel 42 continues to rotate, it is ensured that the movement trajectories of the two eccentric wheels in the front and rear directions are opposite movement directions at any time. In addition, they can be reciprocated, providing the possibility to drive the alternate motion of the cutting knives.

Figure 10:
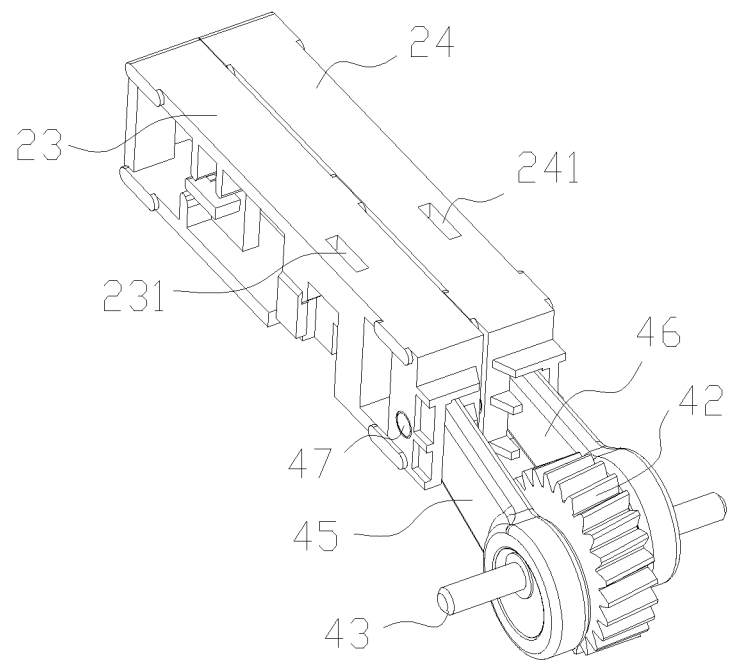
FIG. 10 is a schematic diagram of a linkage state structure of the knife arm of the present invention.
Figure 11:
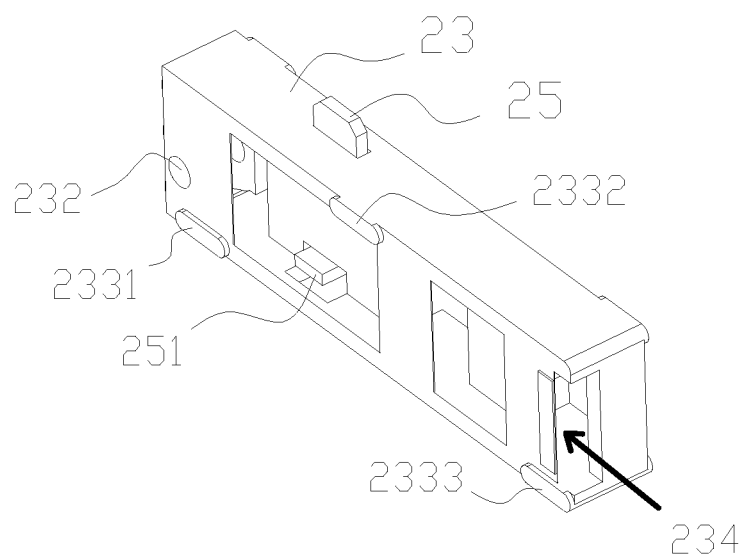
FIG. 11 is a schematic diagram of the structure of a left knife arm of the present invention.

As shown in FIGS. 4, 10 and 11, the left connecting rod pin hole 452 and the right connecting rod pin hole 462 are respectively connected to the knife arm pin holes at the rear end of the knife arms through a left pin rod 47 and a right pin rod 48. The cooperation of the pin rods and the corresponding pin holes realizes the rotational connection therebetween. As shown in FIG. 11, a left knife arm pin hole 232 is provided at the rear end of the left knife arm 23, and the left pin rod 47 passes through the left knife arm pin hole 232 and the left connecting rod pin hole 452 at the same time to realize the rotational connection between them. The structure of the right knife arm is basically the same as that of the left knife arm.

The left knife arm 23 and the right knife arm 24 are used to fix a left knife 21 and a right knife 22 respectively. As can be seen from FIG. 11, an installation channel 234 extending backward along the interior of the left knife arm 23 is provided at the front end of the left knife arm 23. During installation, a left cutting knife handle portion 214 of the left knife 21 is inserted from the installation channel 234 and fixed in the left knife arm. The fixed structure of the right knife arm and the right knife is basically the same as the fixed structure of the left knife arm and the left knife, except that they are distributed symmetrically to maintain left and right balance.

In addition, it can also be seen from FIGS. 10 and 11: the left knife arm 23 and the right knife arm 24 are arranged side by side and abut with each other, and the opposite abutting sides of the left knife arm 23 and the right knife arm 24 are each provided with several smooth protrusions, such as smooth protrusions 2331, 2332, 2333 provided on the left knife arm 23. The side of the right knife arm 24 opposite to the left knife arm is also provided with several alternately distributed smooth protrusions. When the left and right knife arms move alternately, the smooth protrusions are used to reduce the friction force between the left and right knife arms. In order to design a compact structure, the two knife arms are placed together, resulting in direct conflict, which will generate a certain frictional force.

Figure 5:
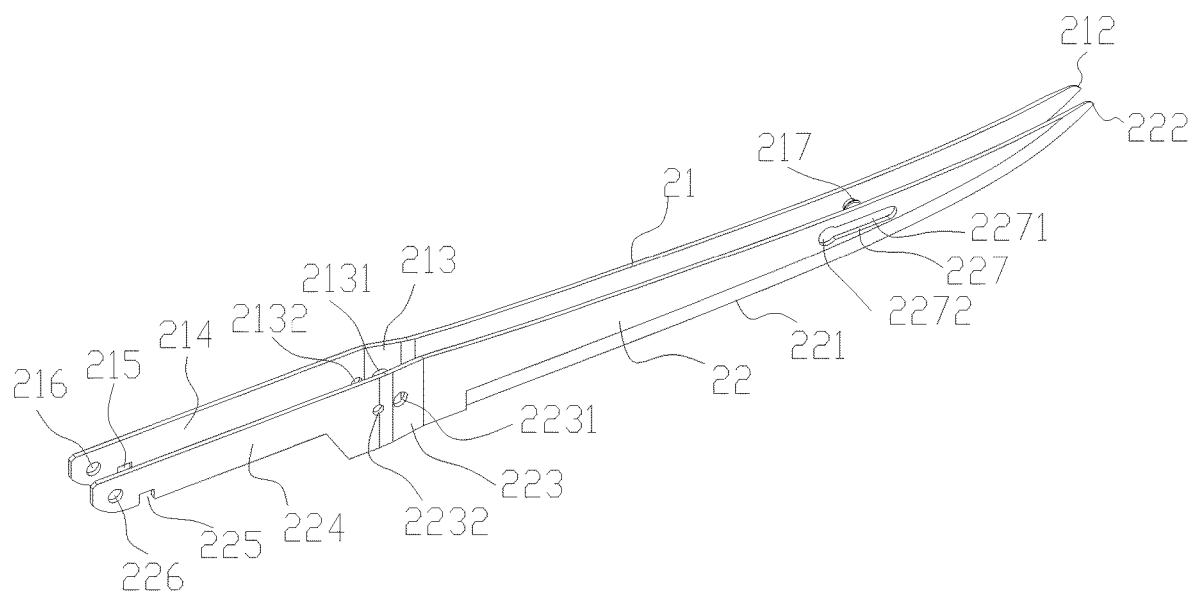
FIG. 5 is a schematic diagram of the structure of a pair of cutting knives of the present invention.

In addition, as can be seen from FIG. 5, the rear end of the handle portion of the left knife 21 is provided with a left notch 215, and the rear end of the handle portion of the right knife 22 is also provided with a right notch 225. The left notch 215 and the right notch 225 are used for fixing the knives in the corresponding knife arms.

Figure 12:
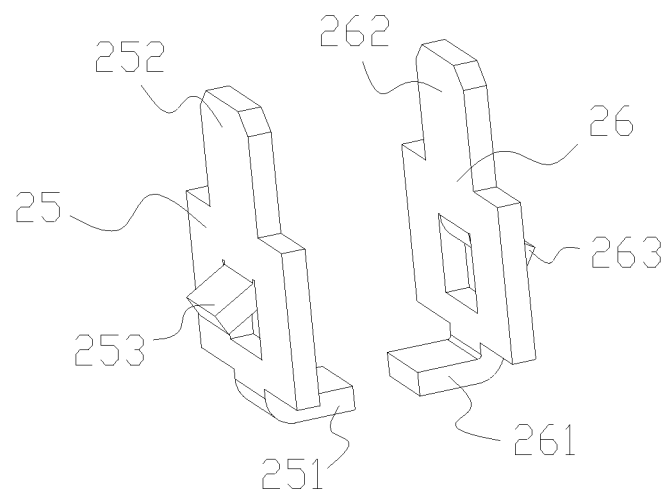
FIG. 12 is a schematic diagram showing the relative position of a pair of knife clips of the present invention.

It can be seen from FIG. 10 to FIG. 12 that a left knife clip 25 is provided in the left knife arm 23 at a position corresponding to the left notch 215 after the left knife 21 is inserted into the installation channel. Similarly, a right knife clip 26 is provided in the right knife arm 24 at a position corresponding to the right notch 225 after the right knife 22 is inserted into the installation channel.

As shown in FIG. 12, the left knife clip 25 has a substantially L-shaped structure, which includes a left knife clamping latch 252 extending vertically at an upper end, a left knife clamping bolt 251 extending laterally at a lower end, and a left spring clamping tongue 253 protruding obliquely and downwardly from a L-shaped back portion. The right knife clip 26 has a symmetrical structure with the left knife clip 25, and also includes a right knife clamping latch 262 extending vertically at an upper end, a right knife clamping bolt 261 extending laterally at a lower end, and a right spring clamping tongue 263 protruding from a L-shaped back portion.

As shown in FIG. 10, at a corresponding position of the rear end of the left knife arm 23, there is a clamping hole 231 of the left knife arm penetrating upward, and a corresponding position of the rear end of the right knife arm 24 is also provided with a clamping hole 241 of the right knife arm penetrating upward.

Figure 6:
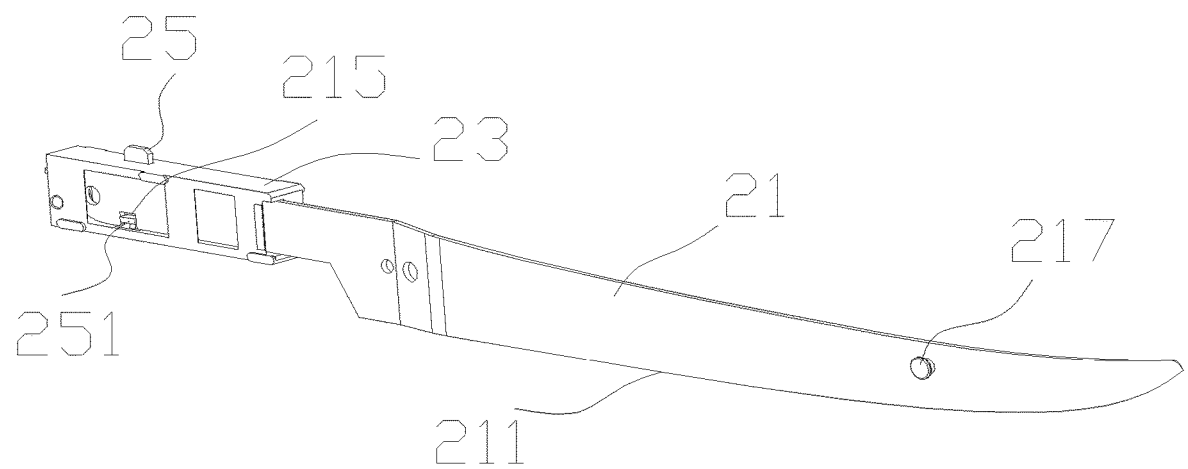
FIG. 6 is a schematic diagram of the structure of a combination of the cutting knife and knife arm of the present invention.
Figure 9:
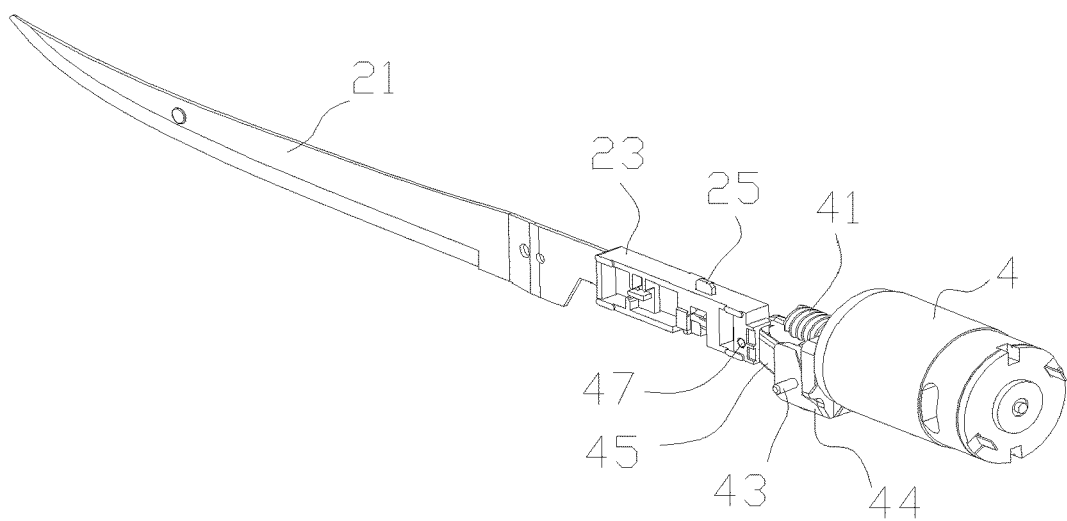
FIG. 9 is a schematic diagram of the structure of a single cutting knife and the driving mechanism of the present invention.

As shown in FIGS. 6, 9 and 11, in order to fix the knife into the arm, first insert the cutting knife handle portion (for example that of the left knife 21) from the installation channel (e.g., the installation channel 234 of the left knife arm) to the bottom; and then, align the knife clip (such as the left knife clip 25) with the notch on the knife handle portion, and lift the knife clip from bottom to top, so that the clamping bolt of the knife clip (such as the left knife clamping bolt 251) is laterally clamped on the cutting knife handle portion inside the notch (e.g. left notch 215), so that the knife is locked in the front-rear direction (in the left-right direction, the knife can be clamped by adjusting the lateral width of the installation channel).

Figure 13:
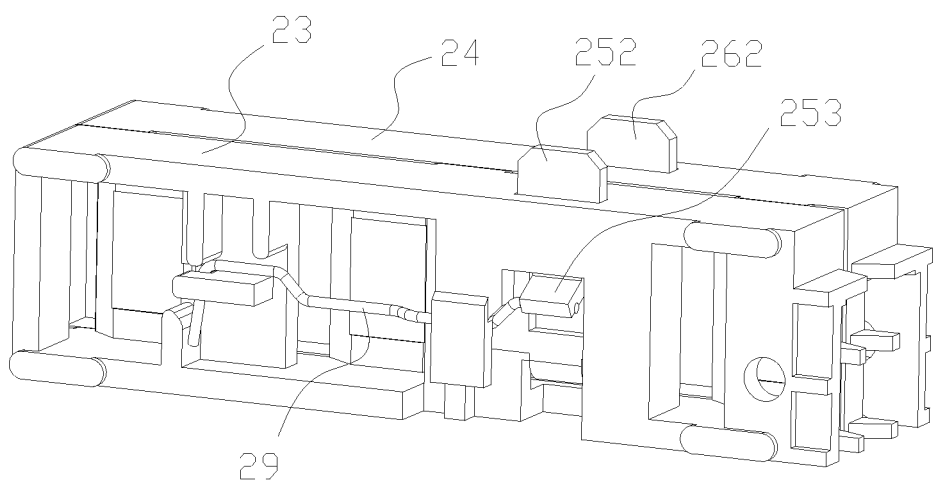
FIG. 13 is a structure schematic diagram of the installation state of an elastic piece of the present invention.
Figure 14:
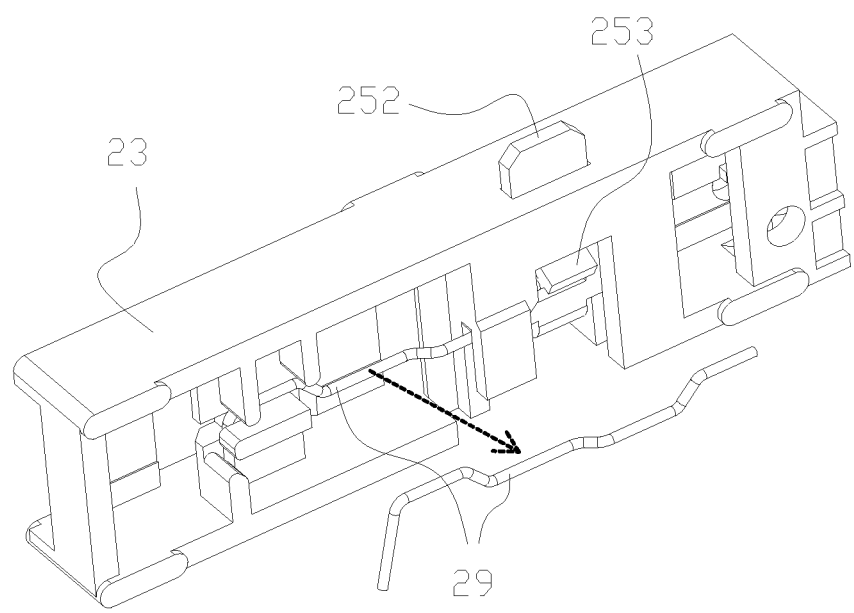
FIG. 14 is a structure schematic diagram of the disassembly state of the elastic piece of the present invention.
Figure 15:
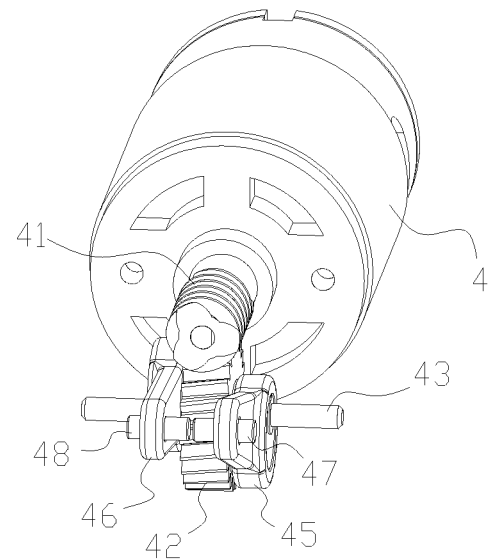
FIG. 15 is a schematic diagram of a motor driving structure of the present invention.
Figure 16:
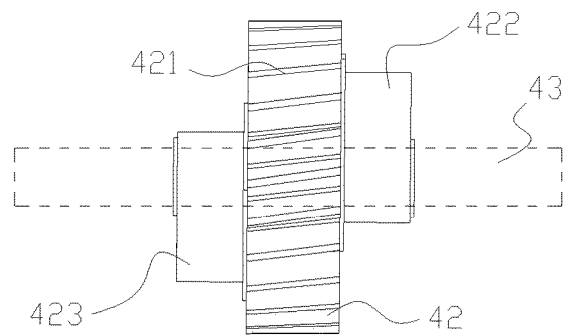
FIG. 16 is a schematic diagram of a worm wheel structure of the present invention.
Figure 17:
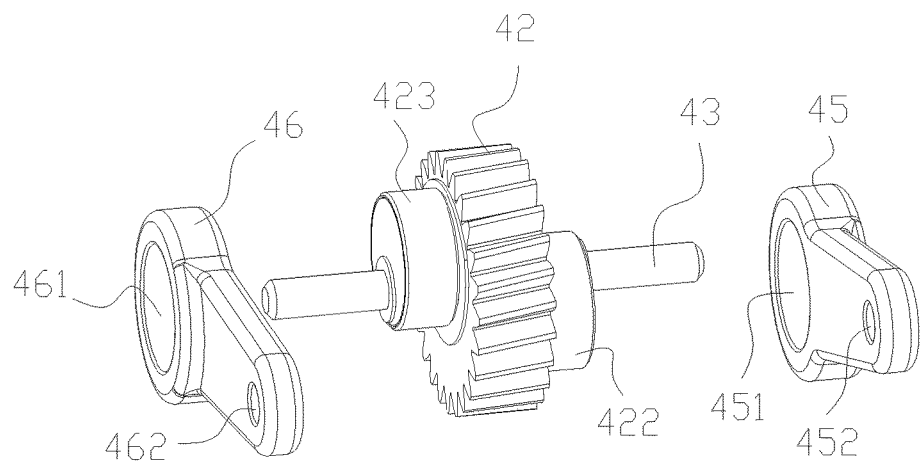
FIG. 17 is an exploded schematic view of the connection structure of the worm wheel and two connecting rods of the present invention.

As shown in FIGS. 13 and 14, in order to keep the knife clips 25, 26 continuously locking the corresponding cutting knives, an elastic piece is applied to the spring clamping tongue to keep the knife clip in a lifted state, and the cutting knife can be continuously locked. As can be seen from the figure, in this embodiment, due to the long length of the elastic piece 29, in order to ensure its elastic performance, its cross section is circular. In other embodiments, other cross-sections are readily conceivable, such as elliptical, crescent-shaped, or rectangular with a sufficient thickness. One end of the elastic piece 29 is clamped on the left knife arm 23, and the other end thereof extends to the left spring clamping tongue 253 of the left knife clip 25. Using the deformation elastic force of the elastic piece 29, the elastic piece 29 exerts an upward elastic force on the left knife clip 25 to keep the left knife clip 25 in a continuously lifted state, thereby continuously locking the left knife. On one side of the right knife clip, there is also a same elastic piece as that corresponding to the left knife clip.

At the same time, the knife clamping latch (for example, the left knife clamping latch 252) passes through the clamping hole on the knife arm (for example, the clamping hole 231 of the left knife arm) from above. The exposed knife clamping latch is convenient to be pressed downward by an external force. Specifically, the knife clamping latch can be moved down by pressing itself, so that the knife clamping bolt can be disengaged from the notch of the knife handle portion downwards, so as to unfix the cutting knife. At this point, the cutting knife can be pulled out from the installation channel. The working principles of the left knife clip 25 and the right knife clip 26 are the same.

Figure 19:
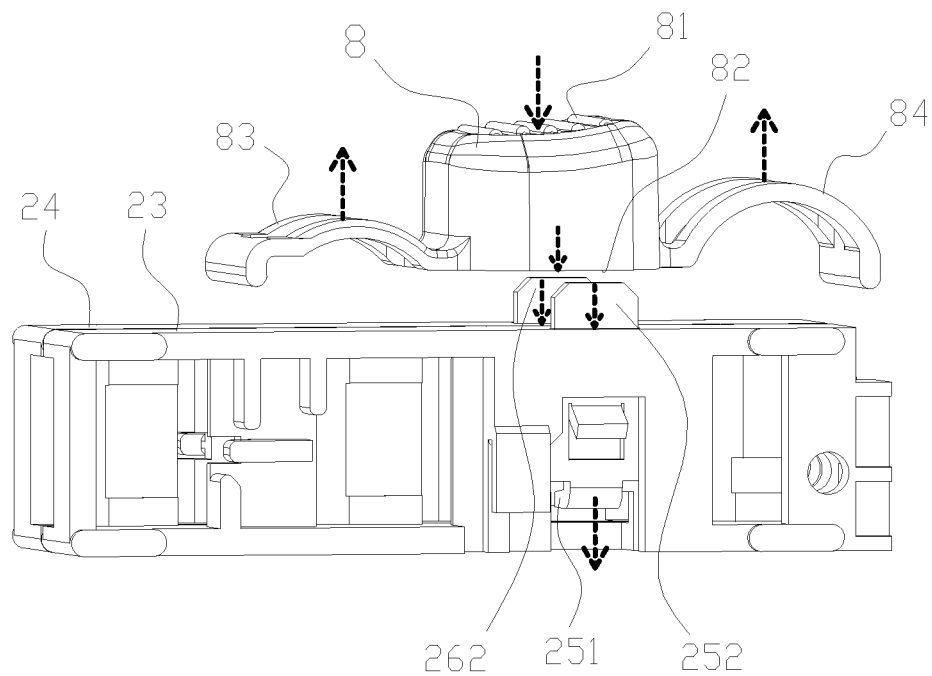
FIG. 19 is a schematic diagram of the interaction relationship between a knife changing button and the knife clip of the present invention.
Figure 20:
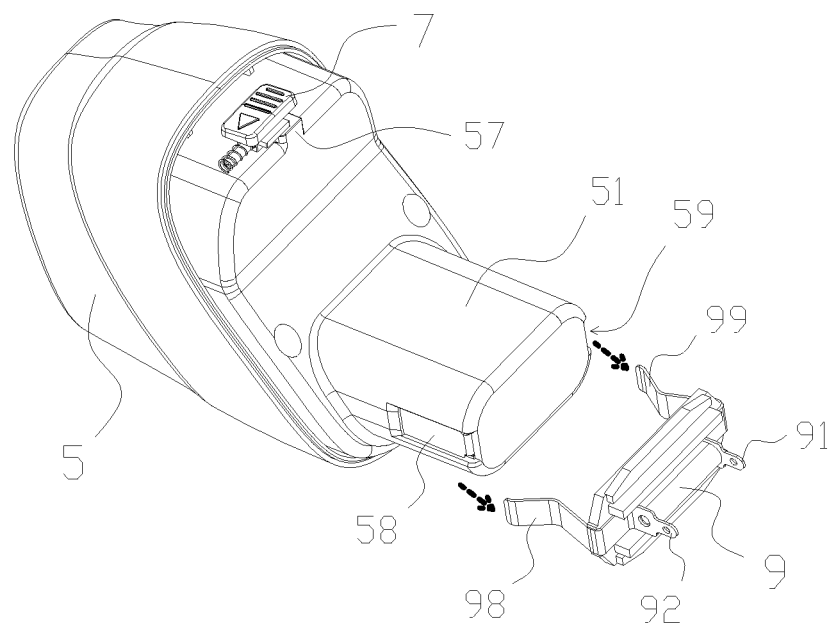
FIG. 20 is a schematic diagram of the interconnection relationship between a power supply module and a power-taking clip of the present invention.
Figure 21:
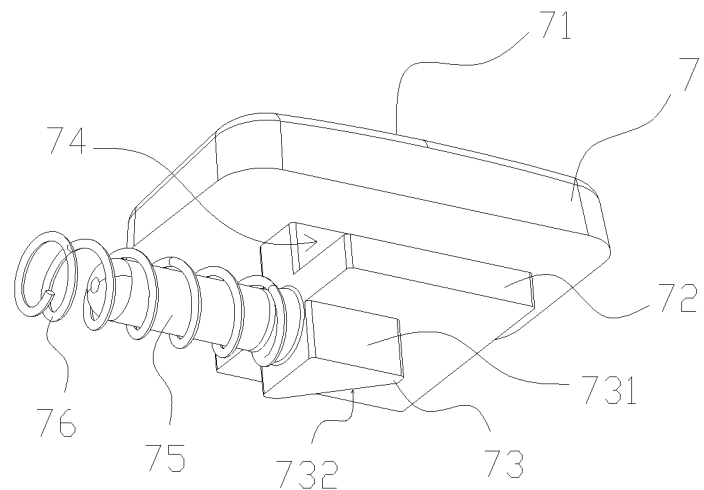
FIG. 21 is a schematic diagram of the structure of a power supply removal plug of the present invention.
Figure 22:
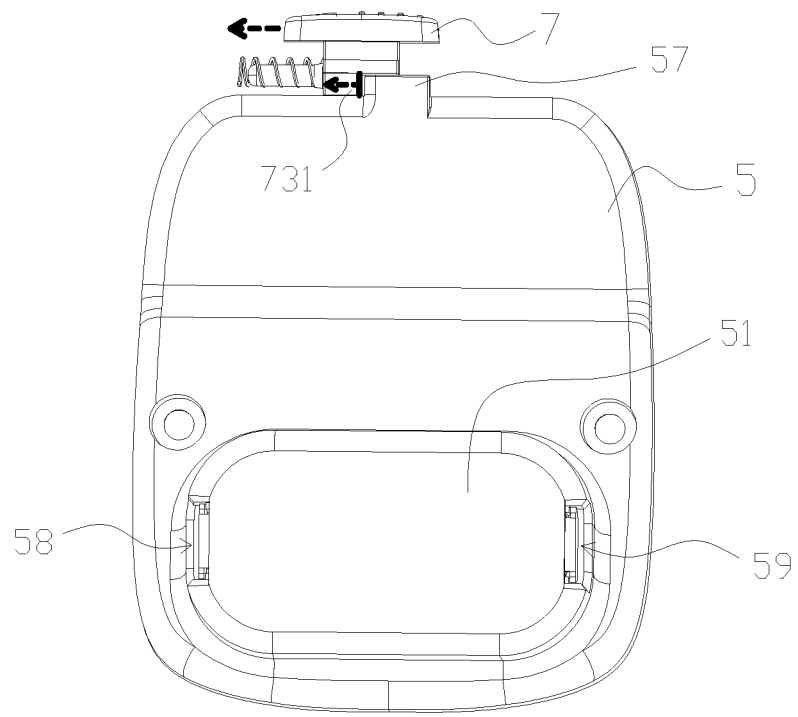
FIG. 22 is a schematic diagram of the interconnection relationship between the power supply removal plug and the power supply module of the present invention.
Figure 23:
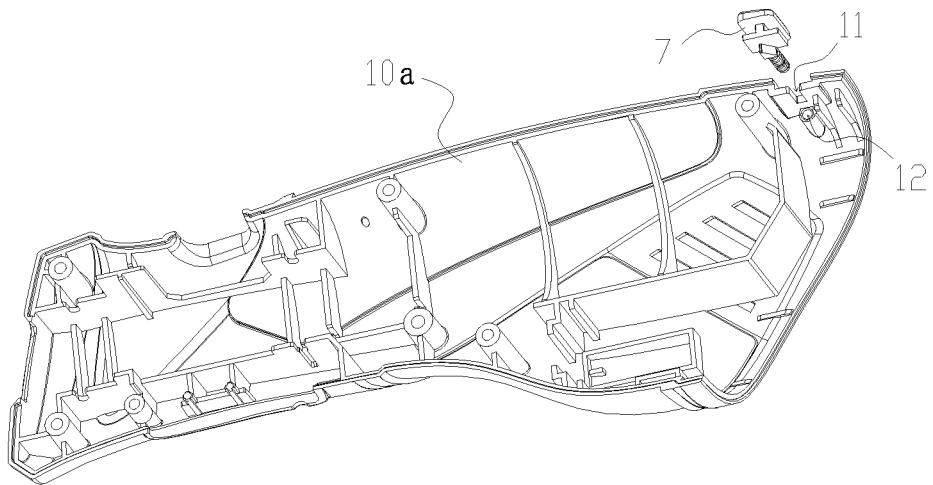
FIG. 23 is a schematic diagram of the state in which the power supply removal plug and a housing are disassembled according to the present invention.

As shown in FIGS. 18 and 19, the knife changing button 8 is provided on each of the knife clamping latches 252 and 262. The knife changing button 8 includes a button cap 81 and elastic wings 83, 84 provided on the front and rear sides of the button cap. The knife changing button 8 is installed in the housing through the elastic wings 83 and 84. Specifically, the elastic wings 83 and 84 can be arranged in a front-rear direction, and a distal end of each elastic wing can be fixed or placed on a support structure in the housing. There is a gap on the housing corresponding to the button cap 81. The top end of the button cap 81 is exposed above the housing through the support of the elastic wings 83 and 84, and a bottom end 82 of the button cap is located above the knife clamping latches 252 and 262. The user presses the button cap 81 so that the bottom end 82 of the button cap presses the knife clamping latches 252, 262, and then moves the knife clamping latches 252, 262 downward. Knife clamping bolts 251, 261 are withdrawn from the notches 215, 225 downward to release the locking of the cutting knives 21, 22. At this time, the cutting knives can be easily pulled forward along the installation channels of the knife arms. When the pressing is released, the button cap 81 returns to its original position under the action of the reverse supporting elastic force of the elastic wings 83 and 84. At this time, the knife clips 25 and 26 are also lifted up and reset under the action of the elastic piece due to the loss of pressure. If the handle portion of the cutting knife is inserted into the installation channel of the knife arm again at this time, the cutting knife can be locked again.

As shown in FIGS. 3 and 4, in this embodiment, a guide channel is designed as two positioning rings distributed in a front and rear positions, namely a first positioning ring 27 and a second positioning ring 28. A space between the two positioning rings is formed as the guide channel, and the left and right knife arms share the guide channel for guiding and restricting the movement of the left and right knife arms only in the front-rear direction. The left knife arm 23 and the right knife arm 24 are arranged side by side and embedded in the guide channel between the two positioning rings. Considering that the left and right knife arms will also rub against the positioning rings when they move alternatively, it is also possible to set smooth protrusions at the contact positions (on the positioning rings or on the knife arms) to further reduce friction.

As shown in FIGS. 5-8, the cutting knife 2 includes a pair of left and right knives 21 and 22 that are adjacent to each other and arranged side by side. The left and right knives each include a blade portion at the front end and a cutting knife handle portion at the rear end. Specifically, the left knife 21 includes a left blade tip 212, a left blade portion 211, a left bending portion 213, the left cutting knife handle portion 214 and a left tail hole 216 in sequence from front to back. Here, the left notch 215 is defined at the rear section of the left cutting knife handle portion 214, and the notch faces downward. The right knife 22 has a symmetrical structure with the left knife 21, and includes a right blade tip 222, a right blade portion 221, a right bending portion 223, a right cutting knife handle portion 224 and a right tail hole 226 in sequence from front to back. Here, the right notch 225 is defined at the rear section of the right cutting knife handle portion 224, and the notch faces downward. In this embodiment, the blades of the blade portions of the two knives are preferably smooth linear blades, and in other embodiments, one or both of the blades may be serrated.

The two oppositely arranged bending portions of the left and right knives make the distance between the blade portions of the left and right knives smaller, which further reduces the distance between the blades of the blade portions of the left and right knives, which can improve the cutting precision and sharpness. A left balance mounting hole 2132 and a left balance guide hole 2131 are provided at the left bending portion 213 for mounting a left balance block 31. Similarly, a right balance guide hole 2231 and a right balance mounting hole 2232 are provided at the right bending portion 223 for mounting a right balance block 32.

Figure 7:
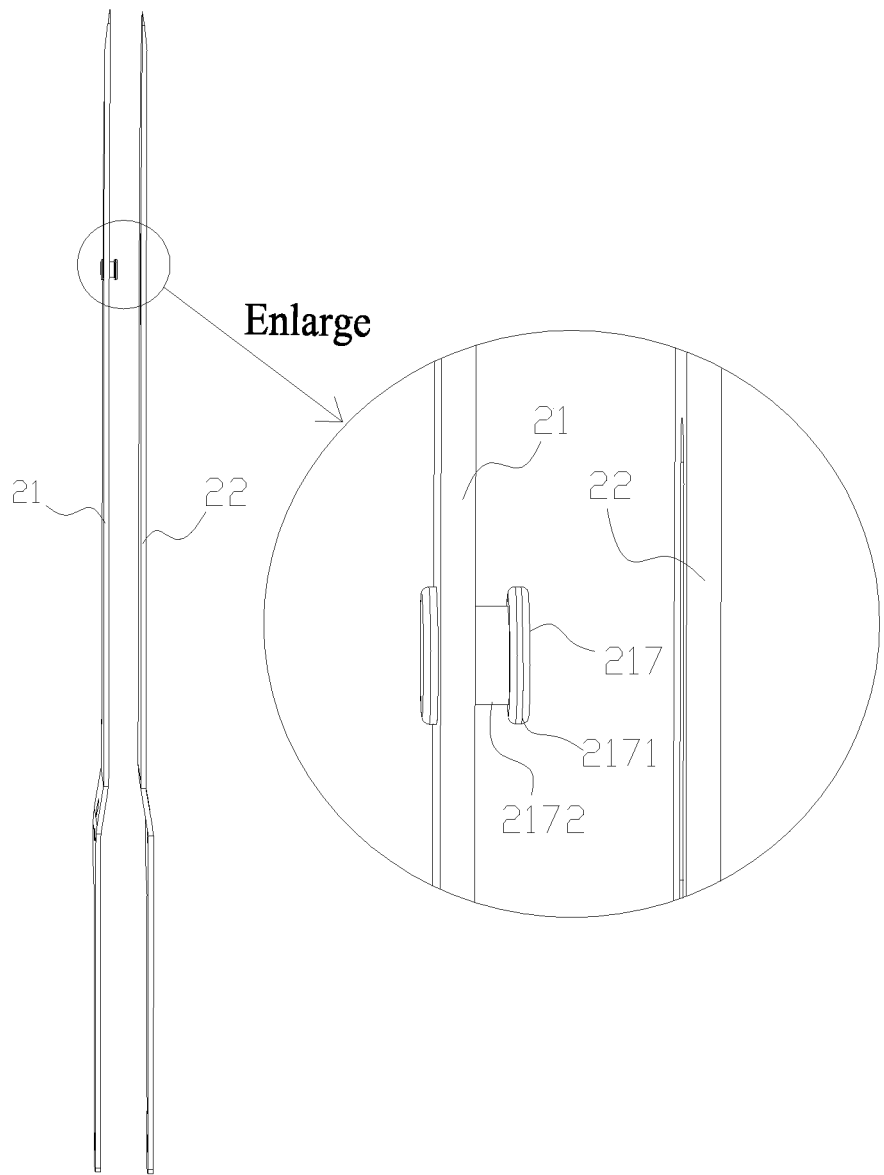
FIG. 7 is a top view of a separated state of the cutting knives of the present invention and its partial enlarged view.
Figure 8:
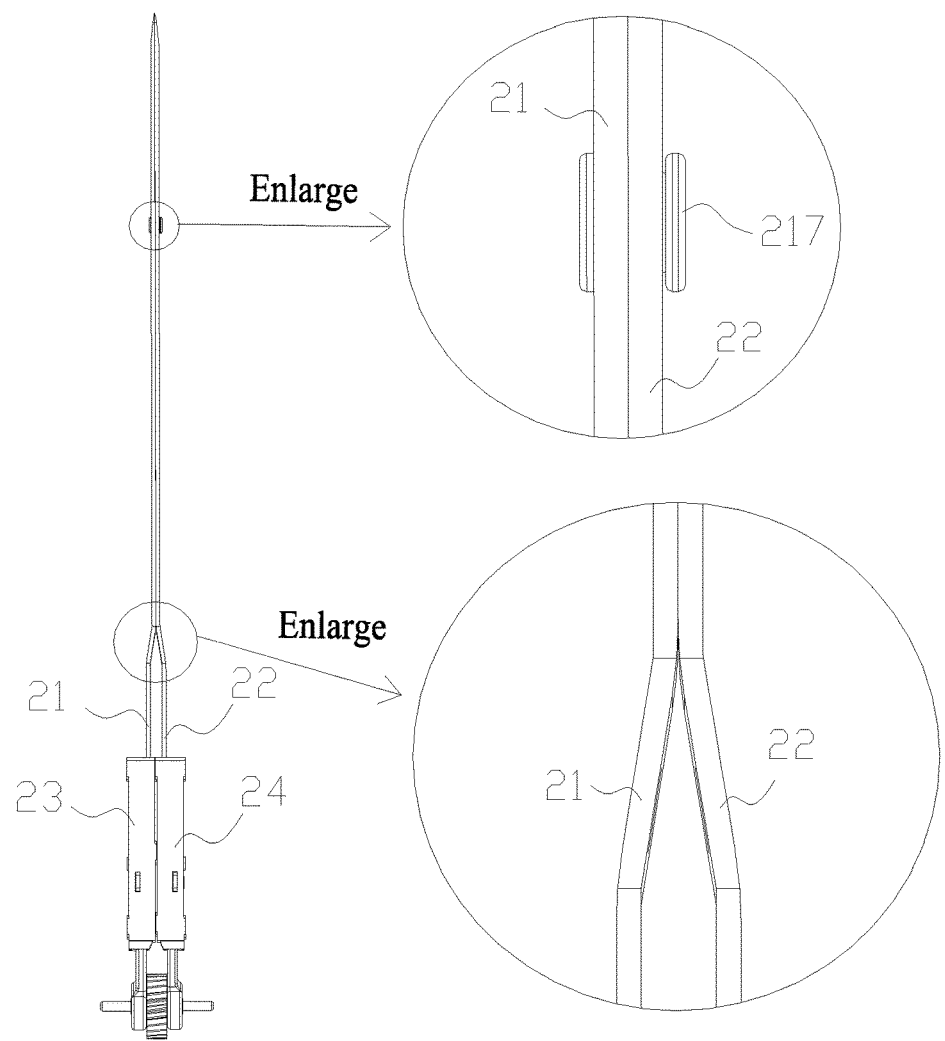
FIG. 8 is a top view of a combined state of the cutting knives of the present invention and its partial enlarged view.

As shown in FIGS. 5, 7 and 8, the blade portion 221 of the right knife is provided with a strip hole 227 penetrating the left and right sides, and the strip hole is arranged in the front-rear direction. A mushroom-shaped convex cap 217 is provided at a position, which is opposite to the position of the strip hole 227, of the blade portion 211 of the left knife. The convex cap 217 includes a rod portion 2172 and a cap portion 2171 at the end of the rod portion. The rod portion 2172 passes through the strip hole 227 and the cap portion 2171 is located outside the strip hole 227. The cap portion 2171 and the blade portion 211 of the left knife sandwich the blade portion 221 of the right knife. The diameter of the cap portion 2171 in a vertical direction is larger than the width of the strip hole 227 in the vertical direction. It is used to limit the degree of separation of the two knives to prevent the left or right knife from being seriously deviated to the sides or up and down due to accidents during the cutting process, and to further protect personal safety.

One end of the strip hole 227 is provided with a thick hole portion 2272 communicating with it. The width of the strip hole itself in the vertical direction is smaller than that of the thick hole portion, and it is a thin hole portion 2271. The diameter of the thick hole portion 2272 is larger than that of the cap portion 2171 to facilitate installation. When installing, first pass the cap portion 2171 through the thick hole portion 2272, and then move the relative positions of the two knives to move the convex cap 217 into the thin hole portion 2271. When the two knives move alternatively, due to the limitation of the stroke, the convex cap 217 will only move within the range of the thin hole portion 2271.

Also as shown in FIGS. 2-4, the opposite outer sides of the left and right knives are provided with balance blocks 3, which specifically include a left balance block 31 and a right balance block 32. The structures of the left balance block 31 and the right balance block 32 are symmetrical, and even the weights are almost the same, which is beneficial to balance the motion inertia of the two cutting knives. There are a threaded hole and a mounting post on a mounting surface of each balance block. When the balance blocks are installed and fixed from the outsides of the bending portions of the knives, the mounting posts pass through the balance guide holes 2131, 2231, and the threaded holes abut against the balance mounting holes 2132, 2232. At this time, use a screw to pass through the balance mounting hole from the inside of the bending portion and then tighten it on the threaded hole to complete the fixation of the balance block. The left and right balance blocks are fixed in the same way.

The left balance block 31 and the right balance block 32 respectively extend inward from the outer side of the corresponding knives to between the left and right knives, thus forming a pair of anti-pressure portion portions. They are the left anti-pressure portion 311 on the left balance block 31 and the right anti-pressure portion 321 on the right balance block 32 respectively, and the two anti-pressure portions are arranged opposite to each other without contact.

The design of the balance block 3 is more important and has multiple uses. First of all, it can weaken or eliminate the vibration or jitter, or even resonance that may occur in the high-speed reciprocating motion of the strip knives. Secondly, the balance block is fixed between the blade portion and the knife handle portion, which can prevent the knives from being damaged due to sudden or unexpected changes in resistance, such as the knives being stuck by too hard fish meat or fish bones, at this time, the driving mechanism is still running, which may cause a blade body to be easily broken, especially at the position of the bending portion, the design of the bending portion causes the blade body to be bent, and it is more likely to occur in this position if it breaks, and fixing the balance block on the bending portions is beneficial to prevent accidental breakage. Again, it can balance the frictional resistance of movement between the two knives, the distance between the two blade portions is very small at rest or there is direct light contact between the two, during the reciprocating motion, there will be inevitable slight vibration or jitter, which may cause variable friction between the two blade portions, the friction force varies with the magnitude of the squeezing force between the two blade portions, in addition, during the cutting operation, the two blades will be directly squeezed by the fish meat or bone to generate a greater squeezing force, resulting in greater frictional force, the disadvantage caused by the increase of frictional force is obvious, at this time, the anti-pressure portion of the cutting knife plays a protective role, when the two knives are deformed by being squeezed inward, the pair of anti-pressure portions abut against each other to prevent excessive deformation of the knives, and to a certain extent, it can prevent the mutual squeezing force between the knives from being too large, resulting in excessive frictional force. Finally, the balance block can also protect the hand to prevent the fingers from accidentally touching the blade forward, so as to avoid accidental injury.

As shown in FIGS. 20-24, the power supply module 5 is provided with a battery compartment 51 protruding toward a front end, and the battery compartment 51 contains a battery. The front end of the battery compartment 51 is provided with positive and negative electrodes, that is, a first electrode 58 and a second electrode 59 located on both sides of the battery compartment 51, and the two electrodes are respectively connected to two poles of the internal battery.

Figure 24:
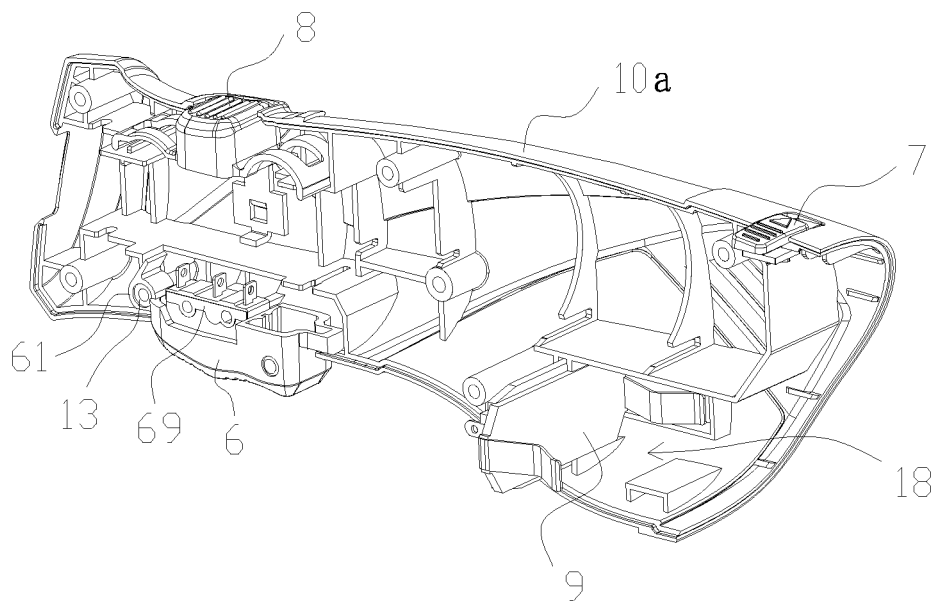
FIG. 24 is a schematic diagram of the internal structure of a right half part of the present invention.

The rear end of the handle 1 is provided with a groove 18 into which the battery compartment 51 can be inserted. As shown in FIGS. 18 and 24, the groove 18 is formed together by a left and right housings. The rear end of the groove 18 is open for the battery compartment to be inserted, and the front end of the groove 18 is provided with a power-taking clip 9. The power-taking clip 9 includes two power-taking contact pieces located on both sides, namely a first power-taking contact piece 98 and a second power-taking contact piece 99, which correspond to the positive and negative electrodes of the battery compartment 51 respectively. When the battery compartment 51 is inserted into the groove, the two power-taking contact pieces are connected to the positive and negative electrodes respectively. The other end of the power-taking clip also includes power-transmitting connection pins 91 and 92 respectively connected with the two power-taking contact pieces, which are used to connect the power supply lines, thereby completing the connection of the power supply circuit.

The rear end of the housing of the handle 1 is provided with the power supply removal plug 7 which includes a push plate 71 exposed out of the surface of the housing, and the push plate 71 can be pushed along a left and right direction. An inner side of the push plate 71 is connected with a triangular bolt 73 in the shape of a right-angled triangle, and its two right-angled sides face the front and lateral directions respectively, and its oblique side faces the lateral and rear portion. A side of the triangular bolt 73 facing the lateral portion is provided with a guide post 75, and a compression spring 76 is sleeved on the guide post 75 to continuously exert a reverse elastic force on the triangular bolt.

The structure of installing the power supply removal plug 7 on the housing is as follows: the upper side of the rear end of the housing is provided with a notch for accommodating the push plate 71, and the notch reserves a sufficient length in the left-right direction as the movable space of the push plate. A slot 11 formed along the left-right direction is arranged below the notch, and a socket 12 is arranged on one side below the slot. Correspondingly, a clamping plate 72 is provided between the push plate 71 of the power supply removal plug 7 and the triangular bolt, and a clamping groove 74 is formed between the clamping plate 72 and the push plate 71. Align the clamping groove 74 with the slot 11 in the housing, so that a connecting column connecting the push plate 71 and the clamping plate 72 in the middle of the clamping groove 74 passes through the slot 11. The clamping groove 74 sandwiches the slot 11 and the wing plates on both sides thereof, so as to limit the power supply removal plug in the up and down direction, and the power supply removal plug can only move along the left and right directions of the slot. In addition, the guide post 75 of the power supply removal plug is inserted into the socket 12, and the guide post 75 can be freely inserted into the socket 12 to a certain extent to further guide the left and right movement of the power supply removal plug. The double guidance of the slot 11 and the socket 12 can prevent the power supply removal plug 7 from swinging unstably.

A corresponding position on the power supply module 5 is provided with a locking protrusion 57. During the process of inserting the battery compartment 51 of the power supply module into the groove at the rear end of the handle, the locking protrusion 57 first abuts against the oblique side of the triangular bolt 73, that is, an inclined surface 732 of the triangular bolt, in the direction from the rear to the front. Continue to increase the pushing force of the locking protrusion 57 imposed on the inclined surface 732 of the triangular bolt, so that the triangular bolt 73 and the entire power supply removal plug 7 move laterally against the elastic force of the compression spring 76 until they move to the side of the advancing direction of the locking protrusion 57 for the locking protrusion 57 to pass over the triangle bolt 73. At this time, the triangular bolt 73 loses the pushing force of the locking protrusion 57 and is reset under the action of the elastic force of the compression spring 76. After reset, a front side of the triangular bolt facing a front direction, that is, a locking surface 731 of the triangular bolt 73, abuts against the rear side of the locking protrusion 57, so that the locking protrusion 57 cannot retreat, thereby locking the power supply module. Thus, the convenient installation process of the power supply module 5 is completed.

When it is necessary to unlock, remove or replace the power supply module 5, push the push plate 71 by hand, so that the push plate 71 drives the triangular bolt 73 to move toward the compression spring 76 until the front side of the triangular bolt, i.e., the locking surface 731 of the triangular bolt 73 leaves the locking protrusion 57. At this time, the power supply module 5 is slightly moved backward, and the locking protrusion 57 retreats over the locking surface 731. At this time, the push plate 71 is released, and the triangular bolt 73 of the push plate is reset under the elastic force of the compression spring 76. During the reset process, the inclined surface 732 of the triangular bolt continues to push the locking protrusion 57, so that the power supply module 5 is released to a further extent, and the power supply module can be easily removed.

As shown in FIGS. 24-29, the switch button 6 includes an elastically reset pressure case 60. The front end of the pressure case 60 is provided with an elastic leg 61. The elastic leg 61 includes an elastic hole 612 close to the pressure case 60 and an elastic tongue 613 away from the pressure case. A shaft column 13 is arranged in the housing, the shaft column 13 is sleeved in the elastic hole 612 of the elastic leg of the pressure case, and the shaft column 13 passes through the elastic hole 612. The elastic tongue 613 is restricted in the housing, and is squeezed toward the side close to the pressure case with the shaft column 13 and the elastic hole 612 as the axis center, thereby providing a rotating elastic force, the pressure case 60 being kept in a tendency to turn out of the housing. The rear end of the pressure case 60 is provided with an engaging block 66, the engaging block 66 protrudes from the rear side of the pressure case, and is held by the housing inside the housing, and cannot rotate to the outside of the housing with the pressure case 60 around the shaft column 13, so as to prevent the pressure case 60 from being excessively separated from the housing.

Figure 27:
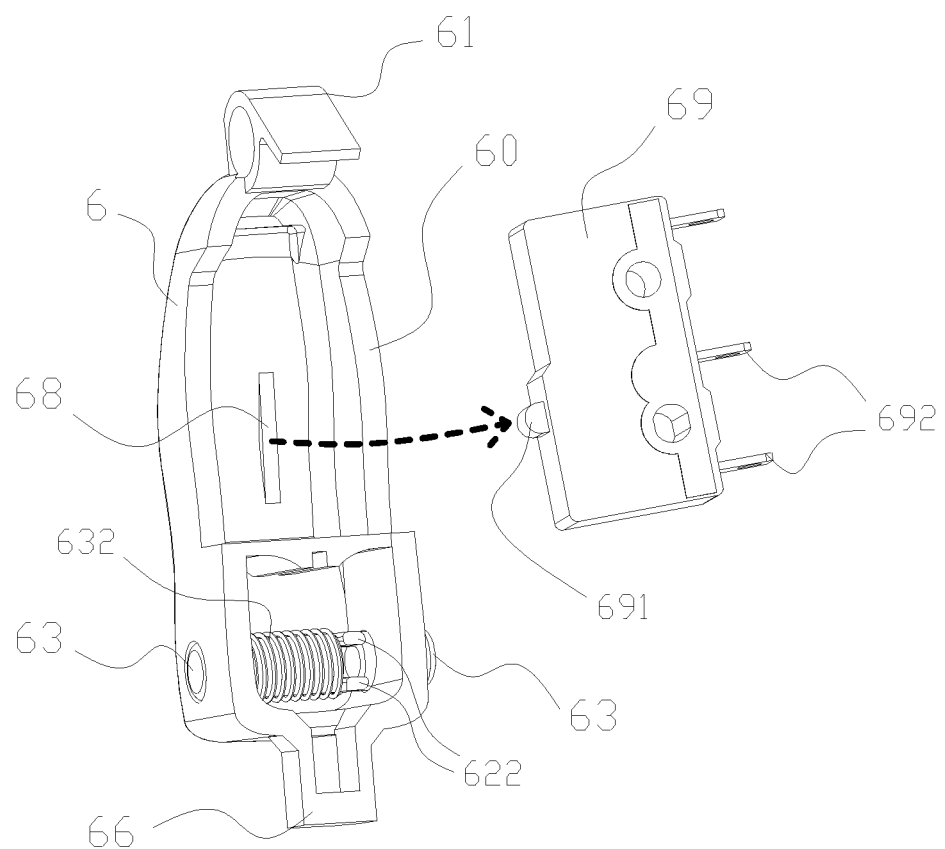
FIG. 27 is a schematic diagram of the structural disassembly of the switch button of the present invention.

As shown in FIG. 27, a pressing switch element 69 located inside the pressure case 60 includes a pressing contact 691 and several wiring pins 692. The pressing switch element is a traditional switch electronic component. By pressing its contact multiple times, the switch will repeatedly switch between on and off. The switch element 69 is connected to its wiring pins by wires, and is connected to the power supply circuit of the motor and the power supply. A pressing portion 68 is provided on the inner side of the pressure case 60, and the pressing portion 68 is aligned with the pressing contact 691 of the switch element. When the user presses the pressure case 60, the pressing portion 68 inside the pressure case is forced to press the switch element, and the pressing is repeated to control on or off of the power supply circuit, thereby controlling the motor to start or stop.

Figure 28:
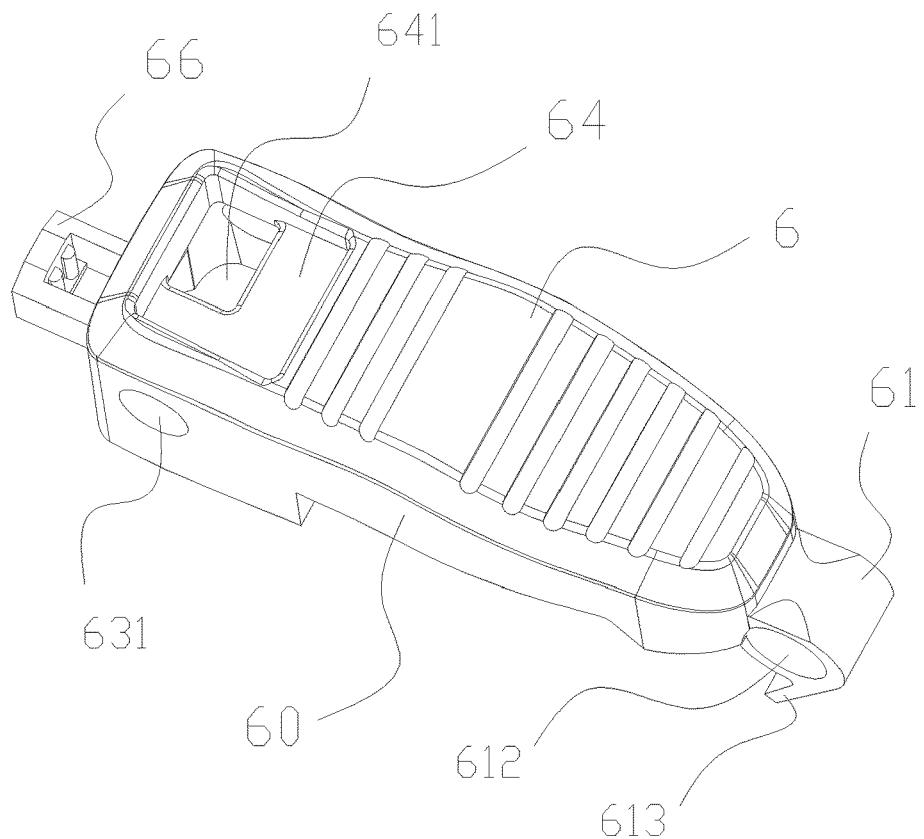
FIG. 28 is a schematic diagram of the structure of a pressure case of the switch button of the present invention.
Figure 29:
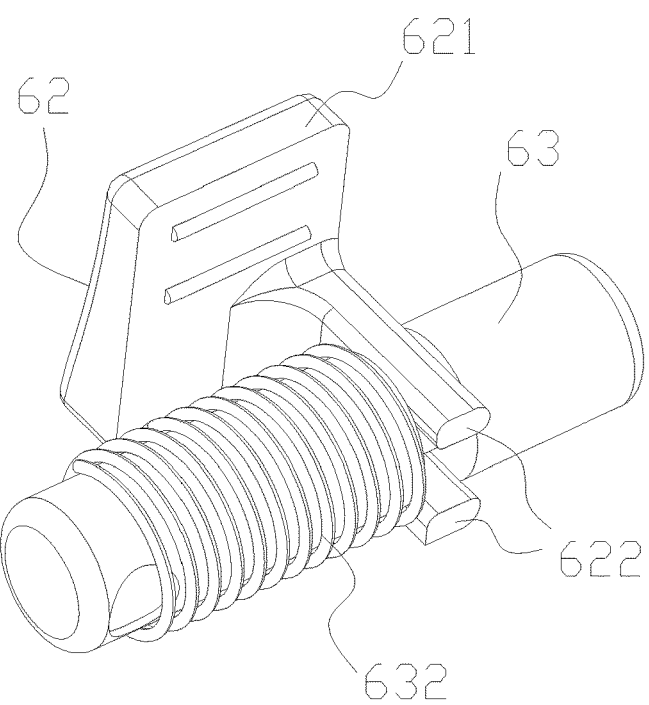
FIG. 29 is a schematic diagram of the structure of a safety bolt of the switch button of the present invention.

As shown in FIGS. 28 and 29, the pressure case 60 is also provided with a safety bolt 62. The safety bolt 62 includes a pushing block 621 that can be toggled left and right. The surface of the pressure case 60 is provided with a bolt groove 64 for allowing the left and right movement of the pushing block 621, and the pushing block 621 is located in the bolt groove 64. The pushing block 621 can be moved left and right in the bolt groove. A bolt hole 641 is provided at the bottom of the bolt groove 64, which communicates with the bottom surface of the bolt groove in a vertical direction. The inner side of the pushing block 621 of the safety bolt is provided with several clamping fingers 622, which pass through the bolt hole 641 and extends into the interior of the pressure case on the inner side of the bottom surface of the bolt groove. One end of each clamping finger 622 extending to the inside of the pressure case 60 is connected with a safety pin 63, and the safety pin 63 is arranged inside the pressure case 60 and passes through both sides of the pressure case 60 in the left-right direction. The left and right movement of the safety pin 63 is controlled by manipulating the pushing block 621, so that the left end of the safety pin 63 extends out of the pressure case to the left, or its right end extends out of the pressure case to the right. A spring 632 is sleeved on the safety pin 63 so as to continuously exert an elastic force toward one side on the safety pin 63.

Figure 25:
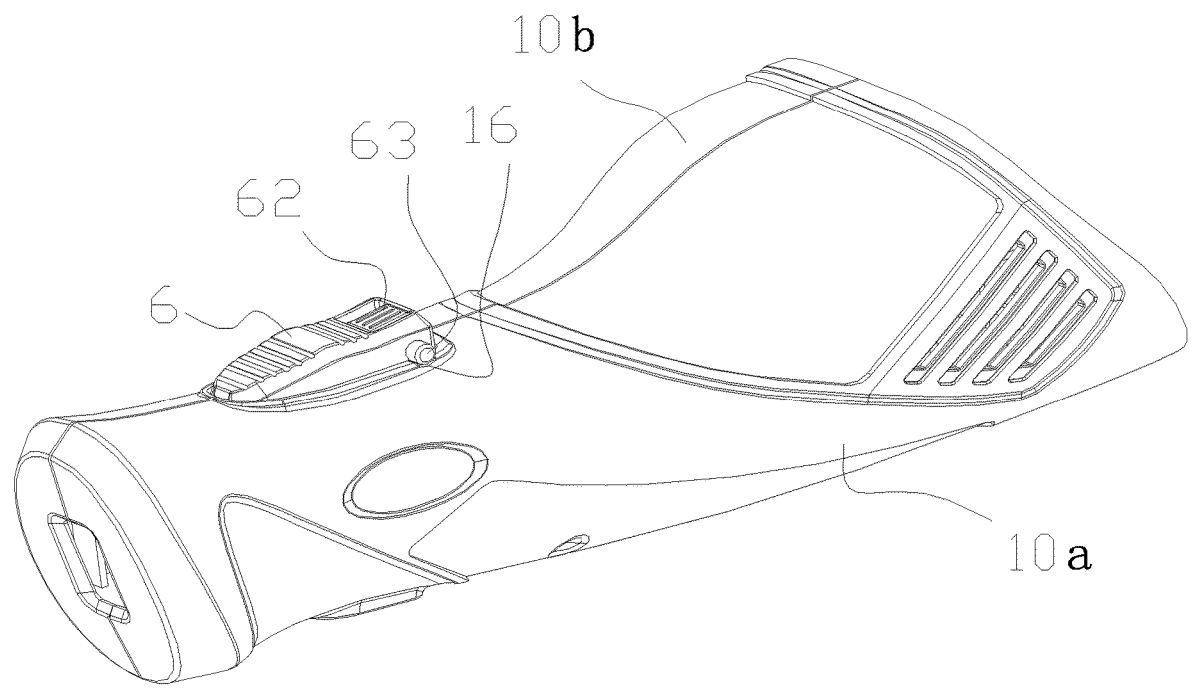
FIG. 25 is a schematic diagram of the connection relationship between a switch button and the housing of the present invention.
Figure 26:
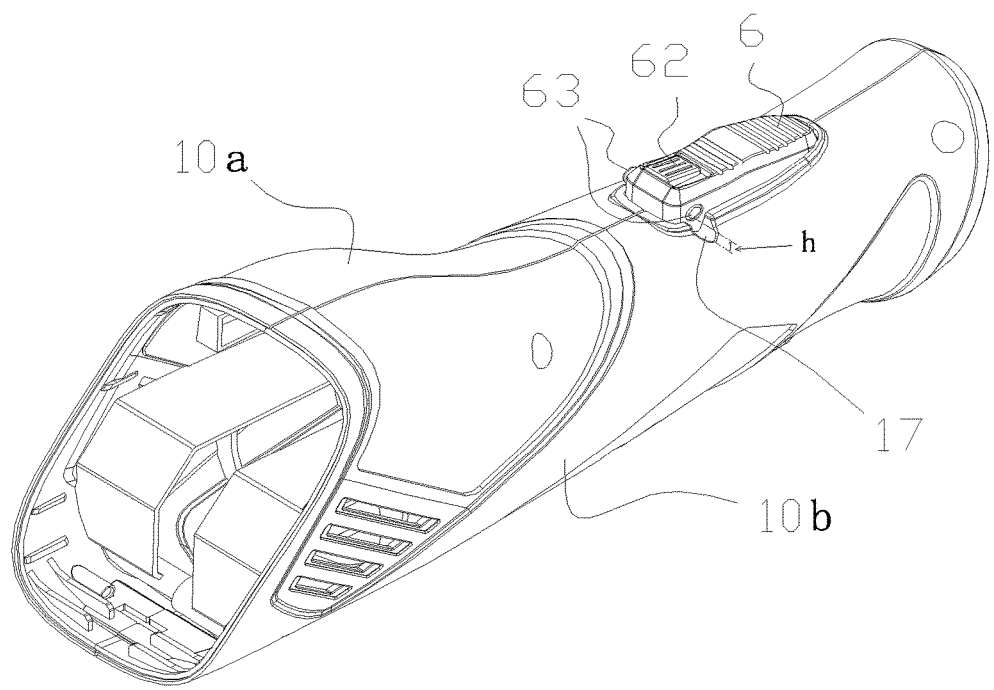
FIG. 26 is a schematic diagram of the connection relationship between the switch button and the housing viewed from another perspective of the present invention.

As shown in FIGS. 25 and 26, the left and right ends of the safety pin 63 are at different heights from the housing. The housing on the side with a smaller height distance is a first limiting portion 16, and the housing on the side with a larger height distance is a second limiting portion 17. When one end of the safety pin 63 is toggled to protrude to the first limiting portion 16 on the side with the smaller height, the pressure case 60 is restricted due to the blocking of the end of the safety pin and the first limiting portion 16, and the pressure case 60 cannot continue to press and touch the switch element. At this time, pressing the pressure case cannot touch the switch element 69. When the other end of the safety pin 63 is toggled and protrudes to the second limiting portion 17 on the side with the larger height, the end of the safety pin located at the first limiting portion 16 is retracted into the housing, and the restriction from the first limiting portion disappears, and the pressure case 60 can continue to press and touch the switch element. When the pressure case is continued to be pressed, the other end of the safety pin is blocked by the second limiting portion 17 and cannot be pressed further, so the damage of excessive pressing can be prevented, thereby protecting the switch element. As shown in FIG. 26, the height difference h between the safety pin 63 and the second limiting portion 17 is approximately equal to the first limiting portion 16 and the second limiting portion 17. The pressure case 60 can only be pressed down by a height of h, and then it is blocked by the second limiting portion 17 and cannot be pressed further.

The spring 632 continuously exerts an elastic force towards the first limiting portion 16 on the safety pin. In a state of no operation, one end of the safety pin will automatically extend to the first limiting portion to lock the switch button 6, and this can avoid accidental activation of the fish cutter, resulting in possible accidental injury. When in use, the knives can only be started after the safety pin is toggled.

This embodiment provides a core drive solution in the handle, with its own cutting function to save manpower and improve slaughter experience and efficiency. Moreover, it has compact and small structure, and the overall shape and size are close to that of a traditional cutter which is convenient to carry and operate. The specific working principle is as follows: the motor 4 runs under the power supply of the power supply module 5; first, the worm 41 is driven to rotate, the worm drives the worm wheel 42 to rotate, the worm wheel drives the two eccentric wheels 422, 423, and the eccentric wheels drive the connecting rods 45, 46 to swing, the connecting rods output the reciprocating motion in the front-rear direction to the knife arms 23 and 24, the knife arms only reciprocate in the front-rear direction under the restriction of the positioning rings 27 and 28 and the driving of the connecting rods, and the knives 21 and 22 fixed on the knife arms then realize the alternate cutting motion back and forth. When in use, the blades of the knives are pressed against the position to be cut of the fish, and the partial cutting can be automatically completed. The switch button can freely control the start or stop of the cutting motion.

The fish cutter of this embodiment does not have high requirements on the cutting board, and the automatic cutting can be completed by pressing the blade against the fish meat, largely independent of the reverse pressure provided by the cutting board, and the fish cutter is portable and easy to use. When used (for example, for smaller fish), the fish can be fixed with one hand, and the fish cutter can be operated with one hand with the other hand, which is especially suitable for fishing enthusiasts to work in the field. In addition, this embodiment adopts the structure of linkage driving by connecting rods, which has more advantages: first of all, the design of the connecting rod drive has better wear resistance, and even a bearing can be added to the rotating connection end of the connecting rod to achieve higher wear resistance requirements; secondly, the two ends of the connecting rod are directly connected by rotation, the clearance of the motion fit is small, and the running noise is small, the experience is better when using grease; and thirdly, the driving operation of the connecting rod is smoother, which can reduce the energy loss of the front and rear movement, making the cutting faster and the use efficiency higher.

Based on the disclosure and teaching of the above specification, those skilled in the art to which the present invention pertains can also make changes and modifications to the above embodiments. Therefore, the present invention is not limited to the specific embodiments disclosed and described above, and some modifications and changes to the present invention should also fall within the protection scope of the claims of the present invention. In addition, although some specific terms are used in this specification, these terms are only for convenience of description and do not constitute any limitation to the present invention.

The invention claimed is:

1. A portable and easy-to-use alternate fish cutter, comprising a housing constituting a handle, a cutting knife extending from an inside of the handle to an outside of a front end of the handle, a driving mechanism for the cutting knife provided in the handle, a switch button for the driving mechanism located on the housing, and a power supply module located at a rear end of the handle; wherein the cutting knife includes a pair of left and right knives arranged side by side, the left and right knives both include a blade portion located at a front end thereof and a handle portion located at a rear end thereof, and the handle portion is inserted into the handle from the front end of the handle;

the driving mechanism for the cutting knife includes a pair of left and right knife arms arranged in the handle, the handle portion of the left knife is detachably fixed on the left knife arm from front to back, and the handle portion of the right knife is detachably fixed on the right knife arm from front to back, the handle is also provided with a guide rail or a guide channel for guiding the left knife arm and the right knife arm to reciprocate only along a front and rear direction;

the driving mechanism for the cutting knife also includes a worm wheel having two sides arranged behind the left knife arm and the right knife arm, and a rotating shaft of the worm wheel is arranged along a left and right direction and is perpendicular to moving directions of the left knife arm and the right knife arm, both sides of the worm wheel are respectively provided with a left eccentric wheel and a right eccentric wheel, and the rotating shaft of the worm wheel passes through the left eccentric wheel and the right eccentric wheel, a center of the left eccentric wheel and a center of the right eccentric wheel are located on the both sides of the rotating shaft of the worm wheel, when the worm wheel rotates, the motion trajectories of the left eccentric wheel and the right eccentric wheel projected in a front and rear direction alternate;

further comprising a left connecting rod and a right connecting rod connecting the worm wheel and the two knife arms, a front end of the left connecting rod is drivingly connected with a rear end of the left knife arm, and a rear end of the left connecting rod is rotatably connected with the left eccentric wheel of the worm wheel, a front end of the right connecting rod is drivingly connected with a rear end of the right knife arm, and a rear end of the right connecting rod is rotatably connected with the right eccentric wheel of the worm wheel, the left eccentric wheel drives the left knife arm through the left connecting rod, and the right eccentric wheel drives the right knife arm through the right connecting rod;

the driving mechanism for the cutting knife also includes a worm and a motor for driving the worm wheel to rotate, and surfaces of the worm wheel and the worm are both provided with mutually meshing helical teeth, the worm is set on an output shaft of the motor, and the worm is driven by the motor to rotate, and the worm drives the worm wheel to rotate, in the handle, the motor, the worm, the worm wheel, the connecting rods and the knife arms of the driving mechanism are arranged in sequence from the back to front; and the power supply module is connected to the motor and supplies power to it, the switch button is connected to a power supply circuit, and the operation of the motor is controlled by the switch button; wherein the left knife arm and the right knife arm are each provided with an installation channel arranged from front to back, for inserting the handle portions of the left and right knives respectively; the handle portion of the left knife located in its installation channel is provided with a left notch, and the handle portion of the right knife located in its installation channel is provided with a right notch; and a position of the installation channel of the knife arm of the left knife corresponding to the notch of the left knife is provided with a left knife clip, a position of the installation channel of the knife arm of the right knife corresponding to the notch of the right knife is provided with a right knife clip, each of the left and right knife clips includes a knife clamping latch at an upper end and protruding upward, a knife clamping bolt at a lower end and extending laterally, and a spring clamping tongue protruding from a side, the structure of the left and right knife clips is the same or symmetrical;

further comprising a spring or elastic piece connected to the spring clamping tongue at one end, and continuously exerts an upward elastic force on the spring clamping tongue through the spring or elastic piece, so that the corresponding knife clip maintains an upward movement trend, when the handle portion of a corresponding knife is inserted into the corresponding installation channel, the corresponding knife clamping bolt is snapped upward into the notch to lock the knife; at this time, the knife clamping latch extends upward and protrudes above the knife arm.

2. The alternate fish cutter according to claim 1, further comprising a knife changing button, including a button cap and elastic wings arranged on a peripheral side of the button cap, the knife changing button is installed in the housing through the elastic wings, and the elastic wings make a top of the button cap exposed out of the housing upwards, a bottom end of the button cap is located above the knife clamping latch, by pressing the button cap, the bottom end of the button cap presses the knife clamping latch, so that the knife clip moves downwards, the knife clamping bolt is withdrawn from the notch downward to release the locking of the cutting knife; and when the pressing is released, the button cap returns to its original position under the elastic force of the elastic wings.

3. A portable and easy-to-use alternate fish cutter, comprising a housing constituting a handle, a cutting knife extending from an inside of the handle to an outside of a front end of the handle, a driving mechanism for the cutting knife provided in the handle, a switch button for the driving mechanism located on the housing, and a power supply module located at a rear end of the handle; wherein the cutting knife includes a pair of left and right knives arranged side by side, the left and right knives both include a blade portion located at a front end thereof and a handle portion located at a rear end thereof, and the handle portion is inserted into the handle from the front end of the handle;

the driving mechanism for the cutting knife includes a pair of left and right knife arms arranged in the handle, the handle portion of the left knife is detachably fixed on the left knife arm from front to back, and the handle portion of the right knife is detachably fixed on the right knife arm from front to back, the handle is also provided with a guide rail or a guide channel for guiding the left knife arm and the right knife arm to reciprocate only along a front and rear direction;

the driving mechanism for the cutting knife also includes a worm wheel having two sides arranged behind the left knife arm and the right knife arm, and a rotating shaft of the worm wheel is arranged along a left and right direction and is perpendicular to moving directions of the left knife arm and the right knife arm, both sides of the worm wheel are respectively provided with a left eccentric wheel and a right eccentric wheel, and the rotating shaft of the worm wheel passes through the left eccentric wheel and the right eccentric wheel, a center of the left eccentric wheel and a center of the right eccentric wheel are located on the both sides of the rotating shaft of the worm wheel, when the worm wheel rotates, the motion trajectories of the left eccentric wheel and the right eccentric wheel projected in a front and rear direction alternate;

further comprising a left connecting rod and a right connecting rod connecting the worm wheel and the two knife arms, a front end of the left connecting rod is drivingly connected with a rear end of the left knife arm, and a rear end of the left connecting rod is rotatably connected with the left eccentric wheel of the worm wheel, a front end of the right connecting rod is drivingly connected with a rear end of the right knife arm, and a rear end of the right connecting rod is rotatably connected with the right eccentric wheel of the worm wheel, the left eccentric wheel drives the left knife arm through the left connecting rod, and the right eccentric wheel drives the right knife arm through the right connecting rod;

the driving mechanism for the cutting knife also includes a worm and a motor for driving the worm wheel to rotate, and surfaces of the worm wheel and the worm are both provided with mutually meshing helical teeth, the worm is set on an output shaft of the motor, and the worm is driven by the motor to rotate, and the worm drives the worm wheel to rotate, in the handle, the motor, the worm, the worm wheel, the connecting rods and the knife arms of the driving mechanism are arranged in sequence from the back to front; and the power supply module is connected to the motor and supplies power to it, the switch button is connected to a power supply circuit, and the operation of the motor is controlled by the switch button; wherein each outer side of the left knife and the right knife is provided with a balance block, including a left balance block and a right balance block; the left balance block is arranged between the blade portion and the handle portion of the left knife; the right balance block is arranged between the blade portion and the handle portion of the right knife; and the left balance block and the right balance block respectively extend from an outer side of the corresponding knives to between the left and right knives inwardly, thereby forming a pair of anti-pressure portions, that is, a left anti-pressure portion on the left balance block and a right anti-pressure portion on the right balance block, the two anti-pressure portions are arranged opposite to each other without contact.

4. A portable and easy-to-use alternate fish cutter, comprising a housing constituting a handle, a cutting knife extending from an inside of the handle to an outside of a front end of the handle, a driving mechanism for the cutting knife provided in the handle, a switch button for the driving mechanism located on the housing, and a power supply module located at a rear end of the handle; wherein the cutting knife includes a pair of left and right knives arranged side by side, the left and right knives both include a blade portion located at a front end thereof and a handle portion located at a rear end thereof, and the handle portion is inserted into the handle from the front end of the handle;

the driving mechanism for the cutting knife includes a pair of left and right knife arms arranged in the handle, the handle portion of the left knife is detachably fixed on the left knife arm from front to back, and the handle portion of the right knife is detachably fixed on the right knife arm from front to back, the handle is also provided with a guide rail or a guide channel for guiding the left knife arm and the right knife arm to reciprocate only along a front and rear direction;

the driving mechanism for the cutting knife also includes a worm wheel having two sides arranged behind the left knife arm and the right knife arm, and a rotating shaft of the worm wheel is arranged along a left and right direction and is perpendicular to moving directions of the left knife arm and the right knife arm, both sides of the worm wheel are respectively provided with a left eccentric wheel and a right eccentric wheel, and the rotating shaft of the worm wheel passes through the left eccentric wheel and the right eccentric wheel, a center of the left eccentric wheel and a center of the right eccentric wheel are located on the both sides of the rotating shaft of the worm wheel, when the worm wheel rotates, the motion trajectories of the left eccentric wheel and the right eccentric wheel projected in a front and rear direction alternate;

further comprising a left connecting rod and a right connecting rod connecting the worm wheel and the two knife arms, a front end of the left connecting rod is drivingly connected with a rear end of the left knife arm, and a rear end of the left connecting rod is rotatably connected with the left eccentric wheel of the worm wheel, a front end of the right connecting rod is drivingly connected with a rear end of the right knife arm, and a rear end of the right connecting rod is rotatably connected with the right eccentric wheel of the worm wheel, the left eccentric wheel drives the left knife arm through the left connecting rod, and the right eccentric wheel drives the right knife arm through the right connecting rod;

the driving mechanism for the cutting knife also includes a worm and a motor for driving the worm wheel to rotate, and surfaces of the worm wheel and the worm are both provided with mutually meshing helical teeth, the worm is set on an output shaft of the motor, and the worm is driven by the motor to rotate, and the worm drives the worm wheel to rotate, in the handle, the motor, the worm, the worm wheel, the connecting rods and the knife arms of the driving mechanism are arranged in sequence from the back to front; and the power supply module is connected to the motor and supplies power to it, the switch button is connected to a power supply circuit, and the operation of the motor is controlled by the switch button;

a bending portion is provided between the blade portion and the handle portion of the left knife and/or the right knife, and the bending portion makes the distance between the blade portion of the left knife and the blade portion of the right knife smaller than the distance between the handle portion of the left knife and the handle portion of the right knife;

wherein each outer side of the left knife and the right knife is provided with a balance block, including a left balance block and a right balance block; the left balance block is arranged between the blade portion and the handle portion of the left knife; the right balance block is arranged between the blade portion and the handle portion of the right knife; and the left balance block and the right balance block respectively extend from an outer side of the corresponding knives to between the left and right knives inwardly, thereby forming a pair of anti-pressure portions, that is, a left anti-pressure portion on the left balance block and a right anti-pressure portion on the right balance block, the two anti-pressure portions are arranged opposite to each other without contact.

\* \* \* \* \*